United States Patent
Kao et al.

(10) Patent No.: US 8,422,781 B2
(45) Date of Patent: Apr. 16, 2013

(54) METHODS AND SYSTEMS FOR CREATING A HIERARCHICAL APPEARANCE MODEL

(75) Inventors: Jau-Hong Kao, Hsinchu (TW); Chih-Yang Lin, Minsyong Township (TW); Wen-How Wang, Hsinchu (TW); Yi-Ta Wu, Wugu Township (TW)

(73) Assignee: Industrial Technology Research Institute, Hsinchu (TW)

( * ) Notice: Subject to any disclaimer, the term of this patent is extended or adjusted under 35 U.S.C. 154(b) by 1168 days.

(21) Appl. No.: 12/327,031

(22) Filed: Dec. 3, 2008

(65) Prior Publication Data

US 2010/0135530 A1 Jun. 3, 2010

(51) Int. Cl.
G06K 9/68 (2006.01)

(52) U.S. Cl.
USPC .......... 382/168; 382/170; 382/103; 382/165; 382/226

(58) Field of Classification Search .......... None
See application file for complete search history.

(56) References Cited

U.S. PATENT DOCUMENTS

| | | | |
|---|---|---|---|
| 6,002,807 A | 12/1999 | Guerci | |
| 6,826,292 B1 | 11/2004 | Tao et al. | |
| 6,973,201 B1 | 12/2005 | Colmenarez et al. | |
| 7,113,185 B2 | 9/2006 | Jojic et al. | |
| 7,200,270 B2 | 4/2007 | Yamaguchi | |
| 7,246,745 B2 | 7/2007 | Hudnut et al. | |
| 2006/0280380 A1* | 12/2006 | Li | .............................. 382/299 |
| 2006/0285723 A1* | 12/2006 | Morellas et al. | .............. 382/103 |
| 2007/0217676 A1* | 9/2007 | Grauman et al. | ............. 382/170 |
| 2008/0181453 A1* | 7/2008 | Xu et al. | ...................... 382/103 |

FOREIGN PATENT DOCUMENTS

| WO | WO 01/37222 A1 | 5/2001 |
|---|---|---|
| WO | WO 0137222 A1 * | 5/2001 |
| WO | WO 2006/138544 A1 | 12/2006 |

OTHER PUBLICATIONS

Stauffer, Chris, et al., "Learning Patterns of Activity Using Real-Time Tracking", IEEE Transactions on Pattern Analysis and Machine Intelligence, vol. 22, No. 8, Aug. 2000, pp. 747-757.*

Morioka, Kazuyuki, et al., "Global Color Model Based Object Matching in the Multi-Camera Environment", Proceedings of the 2006 IEEEIRSJ International Conference.*

Jepson, Allen, D., et al., "Robust Online Appearance Models for Visual Tracking", IEEE Transactions on Pattern Analysis and Machine Intelligence, vol. 25, No. 10, Oct. 2003, pp. 1296-1311.

Yachi, Kiyotake, et al., "Human Head Tracking using Adaptive Appearance Models with a Fixed-Viewpoint Pan-Tilt-Zoom Camera", Proceedings of the 4th IEEE International Conference on Automatic Face and Gesture Recognition, Grenoble, France, 2000, pp. 150-155.

(Continued)

Primary Examiner — Claire X Wang
Assistant Examiner — Thomas A James
(74) Attorney, Agent, or Firm — Finnegan, Henderson, Farabow, Garrett & Dunner, LLP

(57) ABSTRACT

A method for creating an appearance model of an object includes receiving an image of the object and creating a hierarchical appearance model of the object from the image of the object. The hierarchical appearance model has a plurality of layers, each layer including one or more nodes. Nodes in each layer contain information of the object with a corresponding level of detail. Nodes in different layers of the hierarchical appearance model correspond to different levels of detail.

66 Claims, 22 Drawing Sheets

OTHER PUBLICATIONS

Morioka, Kazuyuki, et al., "Global Color Model Based Object Matching in the Multi-Camera Environment", Proceedings of the 2006 IEEE/RSJ International Conference on Intelligent Robots and Systems, Beijing, China, Oct. 9-15, 2006, pp. 2644-2649.

Arth, Clemens, et al., "Object Reacquisition and Tracking in Large-Scale Smart Camera Networks", Proceedings of the First ACM/IEEE International Conference on Distributed Smart Cameras, Vienna, Austria, 2007, pp. 156-163.

Stauffer, Chris, et al., "Adaptive background mixture models for real-time tracking", Proceedings of the IEEE Computer Society Conference on Computer Vision and Pattern Recognition, Fort Collins, Colorado, 1999, pp. 246-252.

Dempster, A.P., et al., "Maximum Likelihood from Incomplete Data via the EM Algorithm", Journal of the Royal Statistical Society, Series B, vol. 39, No. 1, 1977, pp. 1-38.

Mitchell, Tom M., *Machine Learning*, McGraw Hill, New York, 1997.

Cohen, Ira, et al., "Facial expression recognition from video sequences: temporal and static modeling", Computer Vision and Image Understanding, vol. 91, Issues 1-2, 2003, pp. 160-187.

Dol, Zulkifli, et al., "Face Feature Extraction using Bayesian Network", Proceedings of the 4th International Conference on Computer Graphics and Interactive Techniques in Australasia and Southeast Asia, Kuala Lumpur, Malaysia, 2006, pp. 261-264.

Huang, Yong, et al., "Texture classification by multi-model feature integration using Bayesian networks", Pattern Recognition Letters, vol. 24, Issues 1-3, 2003, pp. 393-401.

Senior, Andrew, et al., "Tracking people with probabilistic appearance models", Image and Vision Computing, vol. 24, No. 11, 2006, pp. 1-8.

Thome, N., et al., "A robust appearance model for tracking human motions", Proceedings of IEEE International Conference on Advanced Video and Signal Based Surveillance, Como, Italy, 2005, pp. 528-533.

Morioka, Kazuyuki, et al., "Global Color Model Based Object Matching in the Multi-Camera Environment", Proceedings of the 2006 IEEE/RSJ International Conference on Intelligent Robots and Systems, Oct. 9-15, 2006, Beijing, China.

Hadjidemetriou, Efstathios, et al., "Multiresolution Histograms and Their Use for Recognition", IEEE Transactions on Pattern Analysis and Machine Intelligence, vol. 26, No. 7, Jul. 2004.

Lazebnik, Svetlana, et al., "Beyond Bags of Features: Spatial Pyramid Matching for Recognizing Natural Scence Categories", Proceedings of the 2006 IEEE Computer Society Conference on Computer Vision and Pattern Recognition (CVPR'06), Jun. 2006.

Baltrunas, Linas, "Multi-dimensional Histograms with Tight Bounds for the Error," 10th International Database Engineering and Applications Symposium (IDEAS'06), Dec. 2006.

European Search Report re: EP 08254068.3-2218 dated May 28, 2009.

* cited by examiner

Figure 8(e)
Figure 8(d)
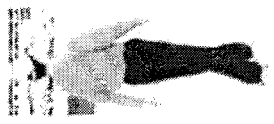
Figure 8(c)
Figure 8(b)
Figure 8(a)
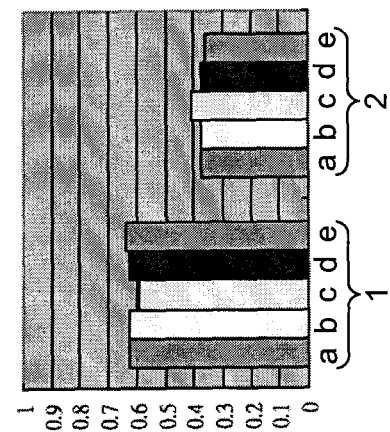
Figure 8(g)
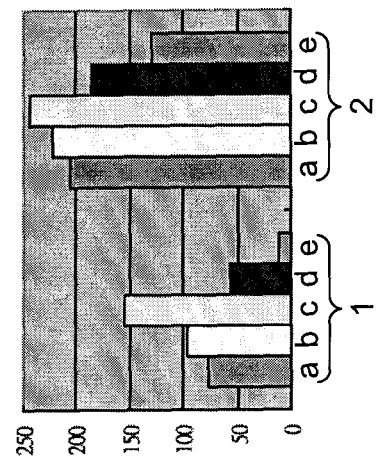
Figure 8(f)

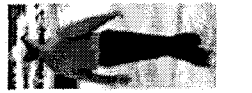
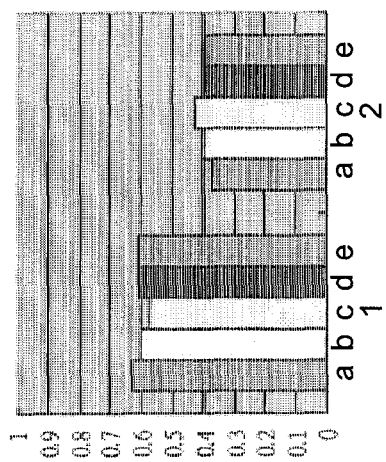
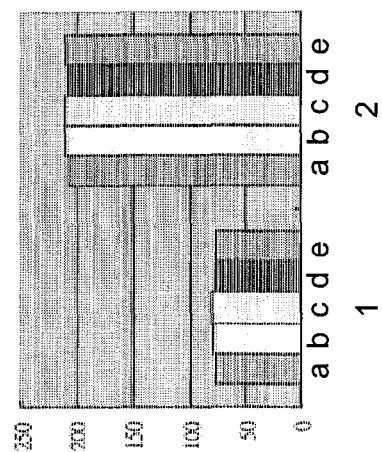
Figure 9(a) Figure 9(b) Figure 9(c) Figure 9(d) Figure 9(e) Figure 9(f) Figure 9(g)

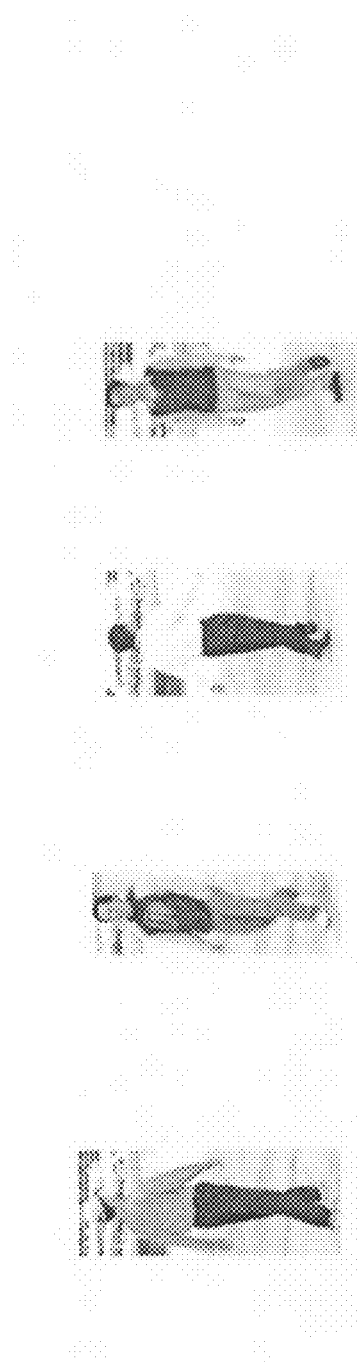
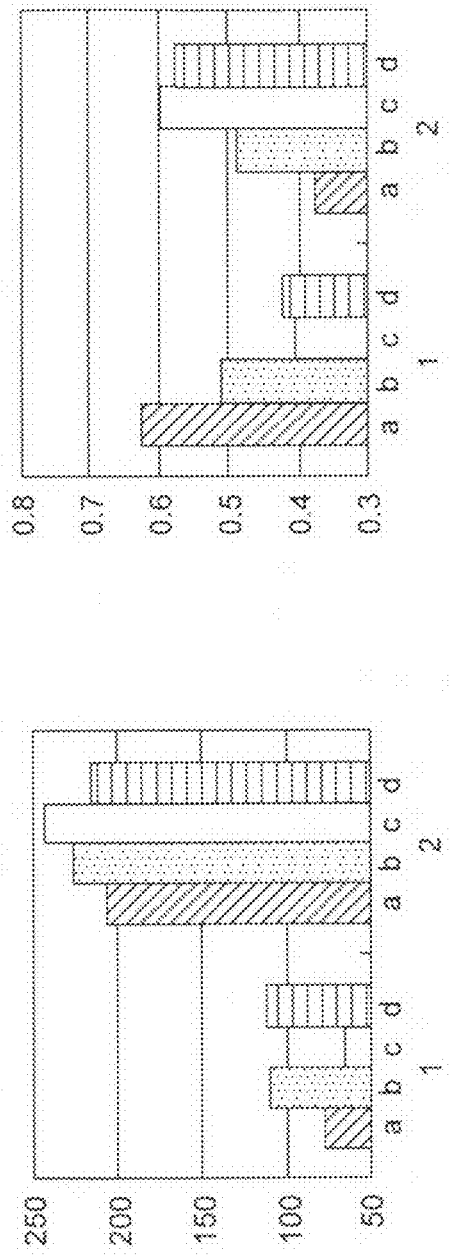

METHODS AND SYSTEMS FOR CREATING A HIERARCHICAL APPEARANCE MODEL

FIELD OF THE INVENTION

This invention relates in general to methods and systems for creating a hierarchical appearance model of an object.

BACKGROUND

Companies or governments often employ surveillance systems to monitor activities within their territories and to enhance security. One topic of surveillance deals with detection of a suspicious object and re-identification of the object from a pool of objects. For example, in a garage building, a surveillance system may detect a suspicious individual leaving at a particular moment and then identify the individual from a number of known people.

An intelligent surveillance system relies on computer technologies to detect and identify objects. An intelligent surveillance system generally includes video acquisition means, such as video cameras, to acquire images of objects, and a computer system to process images and match objects. To build the pool of objects, the video acquisition means can capture the images of all objects of interest and provide the images to the computer system. The computer processes the images and stores the images in certain formats in a database. When the video acquisition means acquires an image of a suspicious object, the computer system processes the image and tries to match it with the image(s) of an object in the database.

The images of the same object at different moments or in different settings can be substantially different, because the posture of the object and environmental factors such as lighting may vary. Therefore, attempting to match two images of the same object from two moments or two different settings by comparing every detail of the images is not only a prohibitive task for the computer, but can generate unreliable results. Accordingly, a computer in a surveillance system generally reduces and abstracts the available information in an image using statistical models. As an example, a histogram can be used to depict a distribution of data over a range of a variable parameter. More specifically, the range of the parameter can be divided into smaller ranges or subranges, and the histogram can include multiple bins, each bin having a width equal to the size of a corresponding subrange and a height corresponding to the portion of the data falling into the corresponding subrange. For example, a color image can be represented with multiple color channels, such as red, yellow, and green channels, each containing a specific color component of the image. A histogram of the color image can show the distribution of pixels in a specific color channel, with the width of a bin corresponding to a subrange of the specific color channel and the height of a bin corresponding to the number of pixels with the colors within the respective subrange. Re-identification then involves comparing the histograms of two objects. If the histograms of two objects match, the two objects may be considered to match each other.

The more information the computer has about the pool of objects, the more accurate the re-identification process is. A surveillance system can provide multiple images of each of the objects in the pool, through a video camera shooting multiple images in a row and/or through multiple cameras capturing multiple images simultaneously. Thus, the computer can generate multiple histograms for each object using the multiple images thereof. In re-identifying a suspicious object, the computer may compare the histogram of the suspicious object against all of the histograms of an object in the pool, thereby improving accuracy. Alternatively, the computer may combine the multiple images of an object to create an appearance model to represent the object. In re-identifying a suspicious object, the computer determines if the image of the suspicious object fits in the appearance model of an object in the pool.

Researchers have proposed different appearance models for different purposes. For example, in "Global Color Model Based Object Matching in the Multi-Camera Environment," *Proceedings of the 2006 IEEE/RSJ International Conference on Intelligent Robots and Systems*, Oct. 9-15, 2006, pp. 2644-49, Morioka et al. proposed an adaptive model that combines multiple histograms of an object and reduces the dimension of the histograms by using principal component analysis. Thus, information from all the histograms is integrated. This approach, however, may experience difficulty when the view of an object is obstructed in an image.

In "Appearance models for occlusion handling," *Image and Vision Computing*, 24(11), 1233-43 (2006), Senior et al. proposed to use statistics of each pixel to create the appearance model. This approach may be inefficient in correlating two images when the object has changed posture. In "Distinctive Image Features from Scale-Invariant Keypoints," *International Journal of Computer Vision*, 60(2), 91-110, 2004, Lowe described a method called SIFT (Scale Invariant Feature Transform) to extract representative interest data points that tend to be invariant when the environment changes. However, the amount of computation required by the SIFT approach may become impractical as the number of images grows large.

Others have proposed to divide an object into multiple parts and to create an appearance model for each part. However, identifying the respective parts across multiple images is a challenging task for a computer.

SUMMARY OF THE INVENTION

Consistent with embodiments of the present invention, there is provided a method for creating an appearance model of an object that includes receiving an image of the object; and creating a hierarchical appearance model of the object from the image of the object. The hierarchical appearance model has a plurality of layers, each layer including one or more nodes. Nodes in each layer contain information of the object with a corresponding level of detail. Nodes in different layers of the hierarchical appearance model correspond to different levels of detail.

Consistent with embodiments of the present invention, there is also provided a surveillance system that includes at least one camera for generating at least one image of an object; and a computer for creating a hierarchical appearance model of the object from the at least one image of the object. The hierarchical appearance model has a plurality of layers, each layer including one or more nodes. Nodes in each layer contain information of the object with a corresponding level of detail. Nodes in different layers of the hierarchical appearance model correspond to different levels of detail.

Consistent with embodiments of the present invention, there is further provided a method for identifying a suspicious object from a pool of objects, wherein each object in the pool has a uniform hierarchical appearance model. The method includes receiving an image of the suspicious object; creating a hierarchical appearance model of the suspicious object from the image of the suspicious object; and comparing the hierarchical appearance model of the suspicious object with the uniform hierarchical appearance models of the objects in the pool. The hierarchical appearance model of the suspicious object has a plurality of layers, each layer including one or more nodes. Nodes in each layer contains information of the suspicious object with a corresponding level of detail. Nodes in different layers of the hierarchical appearance model of the suspicious object correspond to different levels of detail.

Consistent with embodiments of the present invention, there is also provided a surveillance system that includes at least one camera for generating at least one image of each of a plurality of objects in a pool and for generating an image of a suspicious object; and a computer for creating a uniform hierarchical appearance model of each of the objects in the pool from the at least one image of the respective object, for creating a hierarchical appearance model of the suspicious object from the image of the suspicious object, and for comparing the hierarchical appearance model of the suspicious object with the uniform hierarchical appearance models of the objects in the pool. Each of the uniform hierarchical appearance models of the objects in the pool and the hierarchical appearance model of the suspicious object has a plurality of layers, each layer including one or more nodes. Nodes in each layer contain information of the respective object with a corresponding level of detail. Nodes in different layers of each hierarchical appearance model correspond to different levels of detail.

Additional features and advantages of the invention will be set forth in part in the description which follows, and in part will be apparent from that description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain features, advantages, and principles of the invention.

In the drawings,

FIGS. 8(a)-8(i) illustrate performance of hierarchical appearance models consistent with embodiments of the present invention when background lighting changes;

FIGS. 9(a)-9(i) illustrate performance of hierarchical appearance models consistent with embodiments of the present invention with scaling changes due, for example, to changes in a distance between a camera and an object;

FIGS. 12(a)-12(h) illustrate performance of hierarchical appearance models consistent with embodiments of the present invention in distinguishing different objects;

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Consistent with embodiments of the present invention, there are provided methods and systems for creating hierarchical appearance models of objects and using the hierarchical appearance models for object re-identification. A hierarchical appearance model consistent with embodiments of the present invention represents an object with a multi-layer structure. Each layer contains information of the object with a level of detail different than the other layers. The hierarchical appearance model consistent with embodiments of the present invention provides for a coarse-to-fine approach to object re-identification. A surveillance system consistent with embodiments of the present invention may employ one or more image sensors to capture images of objects, and includes a computer for generating, storing, and comparing hierarchical appearance models of objects.

Figure 1:
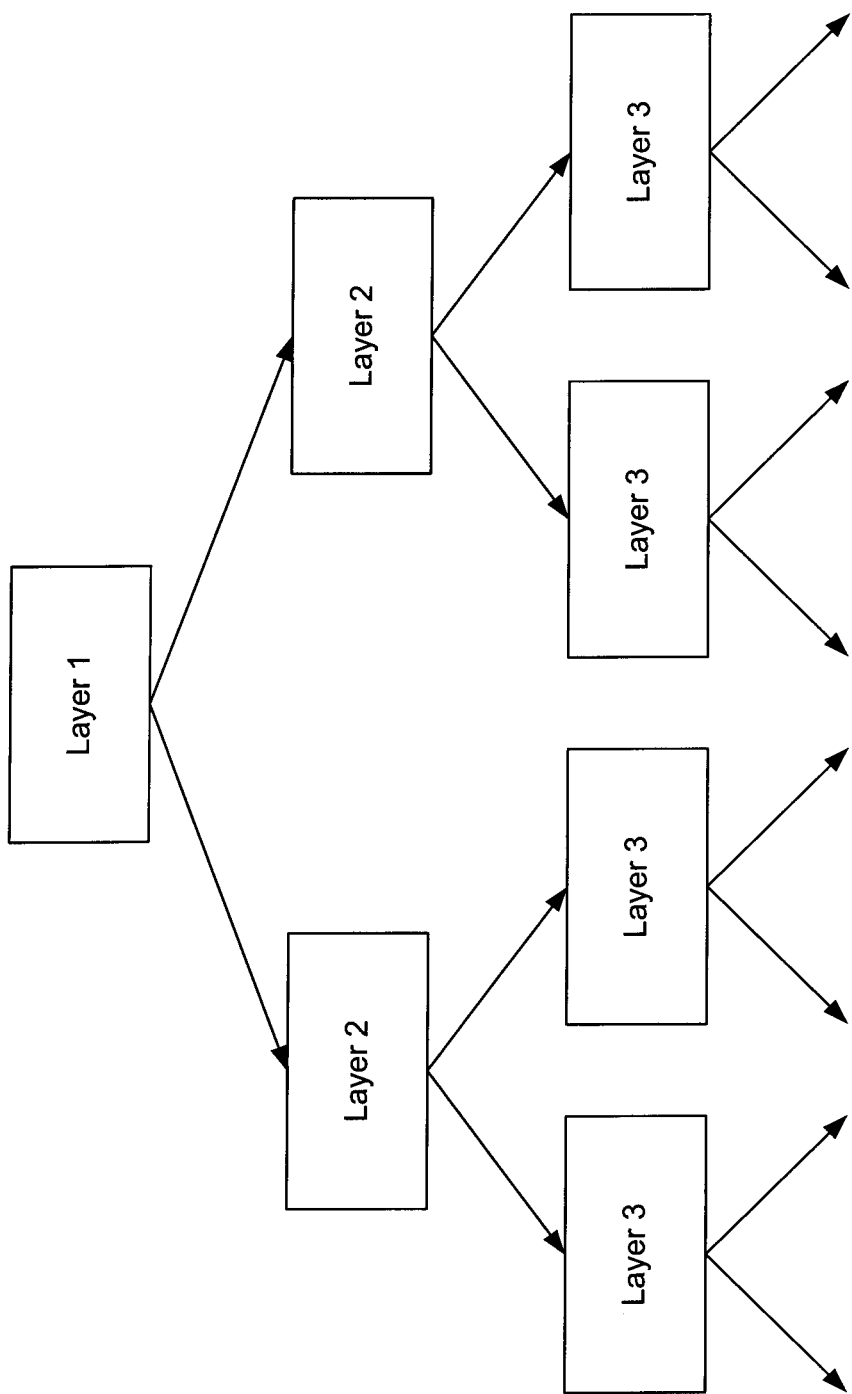
FIG. 1 shows a hierarchical appearance model consistent with embodiments of the present invention.

FIG. 1 shows a simplified view of a hierarchical appearance model consistent with embodiments of the present invention for representing objects. A hierarchical appearance model includes multiple layers. Each layer includes one or more nodes that contain information of the represented object. The nodes at each layer contain information of the represented object with a level of detail different than the nodes at the other layers. In other words, each layer has a resolution different than the other layers in the hierarchical appearance model. The higher the level of detail, the higher the resolution is. Referring to FIG. 1, the top layer of the hierarchical appearance model, labeled "layer 1," includes one node. The information in the node in layer 1 describes the represented object at the most general level and has a level of detail lower than other layers in the hierarchical appearance model. The layer immediately below layer 1, labeled "layer 2," includes nodes that contain information of the represented object at a higher level of detail than the node in layer 1. The layer immediately below layer 2, labeled "layer 3," includes nodes that contain information of the represented object at an even higher level of detail than the nodes in layer 2. Thus, deeper layers in the hierarchical appearance model consistent with embodiments of the present invention have higher resolutions or higher levels of detail than shallower layers.

Although FIG. 1 shows that each node in the hierarchical appearance model propagates into two child nodes, the invention is not so limited. A node in a hierarchical appearance model consistent with embodiments of the present invention can have multiple child nodes.

Figure 2B:
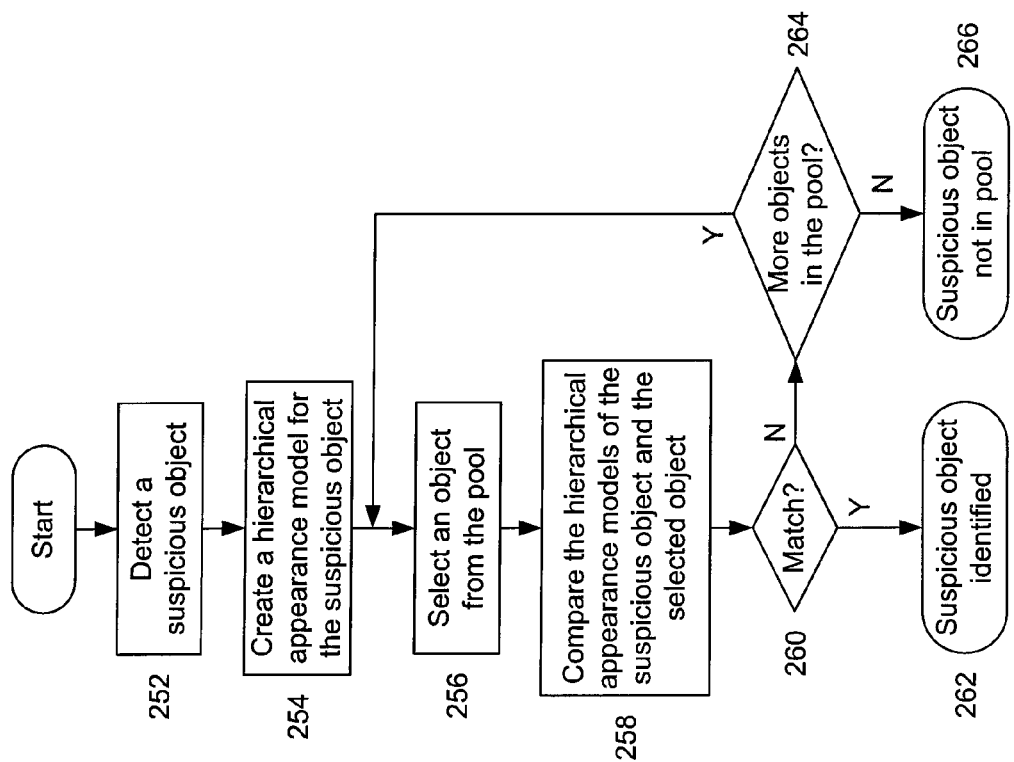
FIGS. 2(b)-2(e) are flow charts for illustrating methods of using hierarchical appearance models for object re-identification consistent with embodiments of the present invention.
Figure 2A:
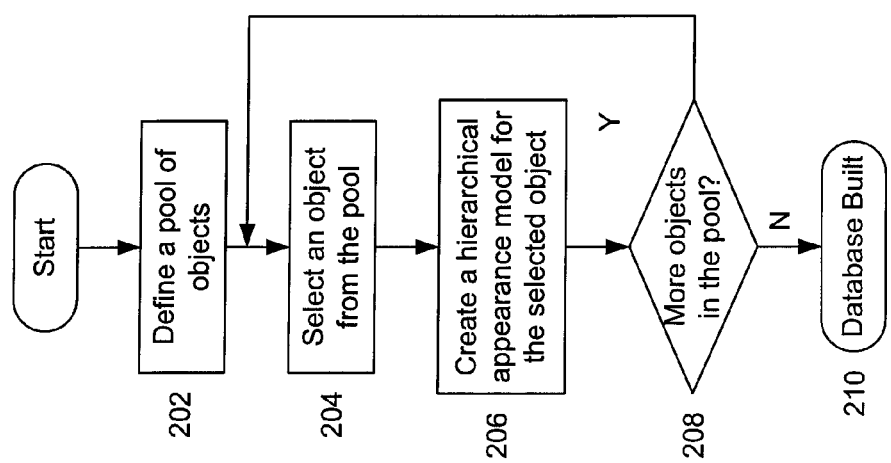
FIG. 2(a) is a flow chart showing a method of creating a hierarchical appearance model consistent with embodiments of the present invention.

FIGS. 2(a) and 2(b) are flow charts for illustrating methods of creating and using hierarchical appearance models consistent with embodiments of the present invention. FIG. 2(a) illustrates a method of building a database of objects using hierarchical appearance models consistent with embodiments of the present invention. FIG. 2(b) illustrates a method of re-identifying a suspicious object in the database of objects.

Referring to FIG. 2(a), a system consistent with embodiments of the present invention first defines a pool of objects from which a suspicious object will be identified (202). The system selects an object in the pool (204) and creates a hierarchical appearance model consistent with embodiments of the present invention to represent the selected object (206). The system repeats the steps of selecting an object in the pool (204) and creating a hierarchical appearance model of the selected object (206) until it has created hierarchical appearance models for all the objects in the pool (208). At the end, a database is created to store all hierarchical appearance models of the objects in the pool (210).

Referring to FIG. 2(b), when the system detects a suspicious object (252), the system creates a hierarchical appearance model consistent with embodiments of the present invention for the suspicious object (254). Then, the system selects an object from the database or the pool (256) and compares the hierarchical appearance model of the suspicious object against the hierarchical appearance model of the selected object (258). If the two hierarchical appearance models match each other (260—Yes), then the system identifies the suspicious object to be the selected object (262). If the two hierarchical appearance models do not match (260—No), the system further selects another object (256) and repeat the step of comparison (258) until all objects in the pool have been compared (264). If after the system has exhausted all the objects in the pool and no match has been found, the system considers the suspicious object to be not in the pool (266).

Definition of the pool depends on the particular application. The objects may be human beings or moving objects such as vehicles. For example, if the suspicious object is a human being who walked out of a store at a particular time during the day, the pool of objects may be defined to include all people who entered the store before the particular time that same day. For another example, if the suspicious object is a car that left a garage, then the pool of objects may contain all cars that entered the garage prior to the moment when the suspicious car left the garage.

Consistent with embodiments of the present invention, a hierarchical appearance model has a predetermined number of layers. The number of layers may be determined based on the specific needs of the application or based on simulation results. If simulation shows that a four-layered hierarchical appearance model results in sufficient accuracy in object re-identification, then a hierarchical appearance model consistent with embodiments of the present invention needs to include only four layers.

Consistent with embodiments of the present invention, the hierarchical appearance model includes information of an object that is relatively invariant when the environment or the posture of the object changes. For example, the color distribution of a person walking about in a store will unlikely change from the moment the person enters the store to the moment the person leaves the store. In this situation, the hierarchical appearance model consistent with embodiments of the present information may include information of the color distribution of the moving object. It is to be understood, however, that in different settings, parameters other than the color distribution, such as dimensions, velocity, etc., may better suit the needs of a hierarchical appearance model consistent with embodiments of the present invention.

Figure 2C:
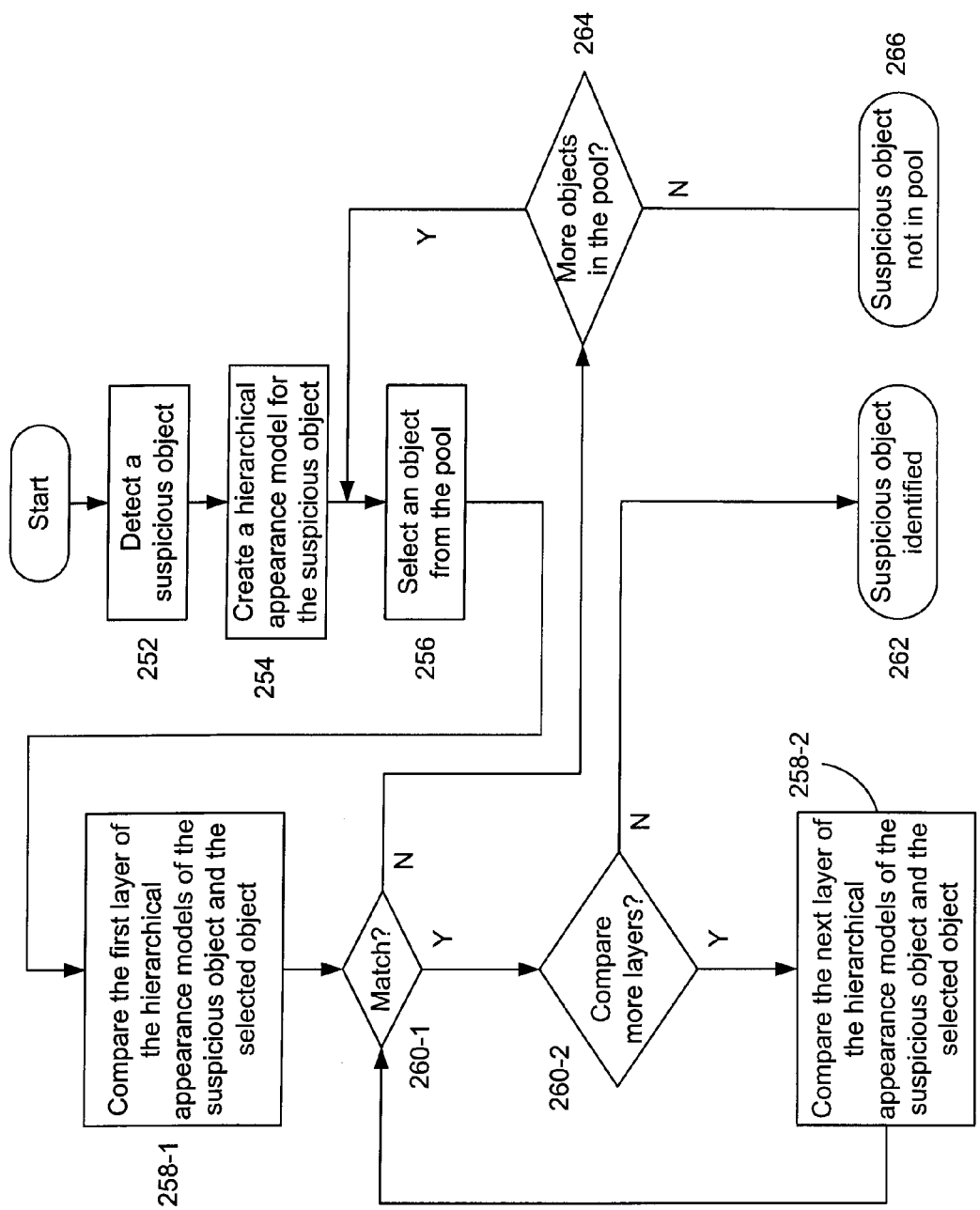

Consistent with embodiments of the present invention, a coarse-to-fine approach may be use to compare the hierarchical appearance models of a suspicious object and a candidate object in the database, at step 258 of FIG. 2(b). Specifically, referring to FIG. 2(c), the system first compares the node at the top layer of the hierarchical appearance model of the suspicious object to the node at the top layer of the hierarchical appearance model of the candidate object (258-1). If the comparison of the top layer nodes of the hierarchical appearance models yields a positive result (260-1—Yes), i.e., a match, then the system proceeds to compare the nodes at the second layer of the two hierarchical appearance models (258-2). After the comparison of one layer, if additional layers need to be compared (260-2—Yes), the system proceeds to compare the next layer of the hierarchical appearance models (258-2).

The coarse-to-fine approach consistent with embodiments of the present invention does not require comparison of all layers of the hierarchical appearance models. Rather, depending on the requirements of the particular application, the comparison may terminate after a certain number of layers. Simulation may also help determine the number of layers to be compared. For example, if simulation shows that comparison of three layers of the hierarchical appearance models has a sufficient accuracy, then the system only needs to compare three layers.

Figure 2D:
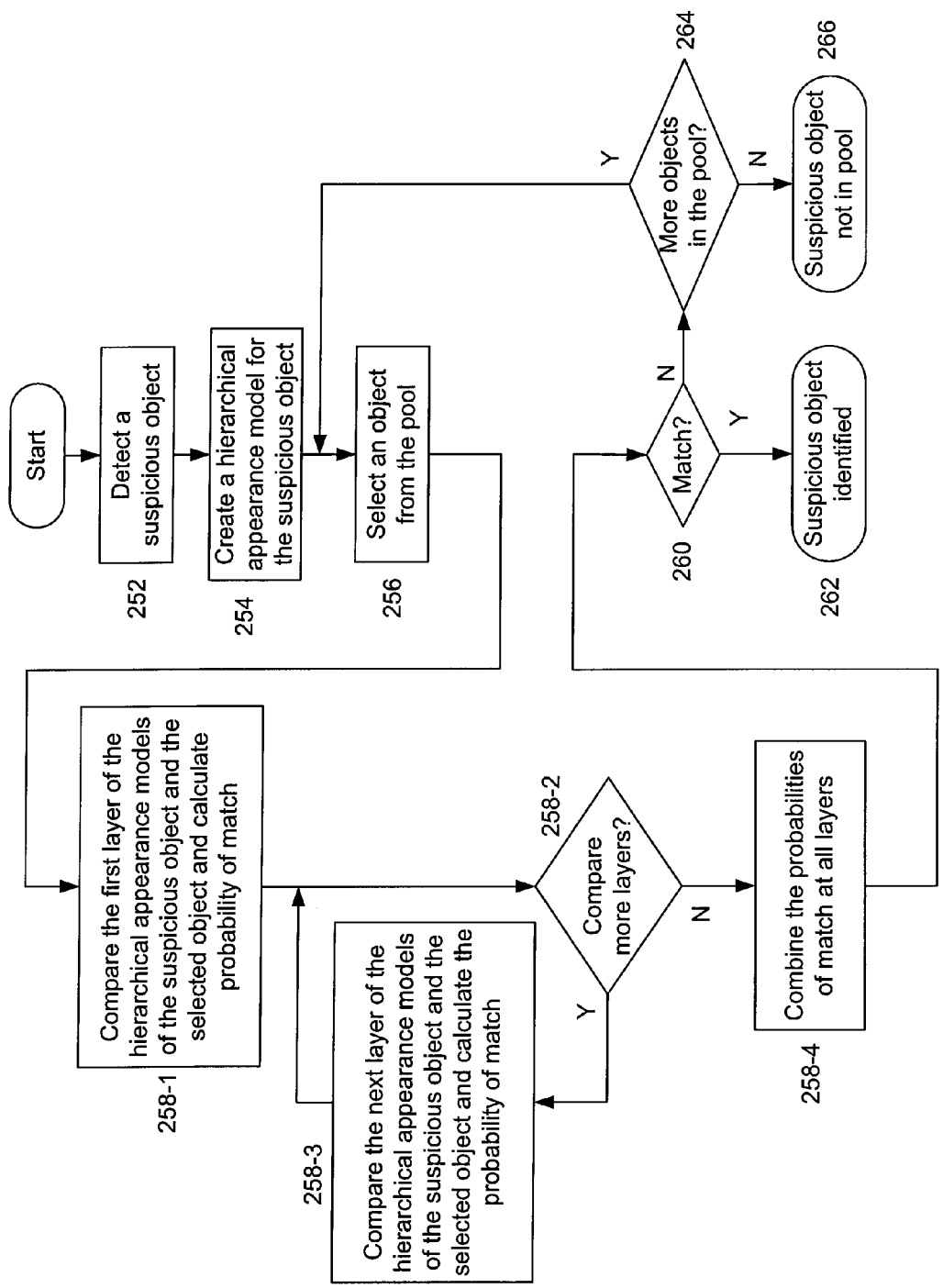

Because the environment or the posture of the object may change between images, the comparison of the images of the same object might not yield perfect matches at every layer of the hierarchical appearance models. Consistent with embodiments of the present invention, a statistical approach as shown in FIG. 2(d) may be adopted to compare two images to take into account possible changes in the environment and the posture of the object. More specifically, referring to FIG. 2(d), a surveillance system compares multiple layers of the hierarchical appearance models of a suspicious object and a candidate object (258-1 through 258-3). At each layer, the system calculates a probability of match (258-1). Then, the probabilities of match at the multiple layers are statistically combined (258-4), based on which the system determines whether the suspicious object matches the candidate object based on the combination result (260). Various statistical tools, such as mean values, weighted sum, or unweighted sum, etc., can be use to combine the results of comparison of the multiple layers of the hierarchical appearance models.

Figure 2E:
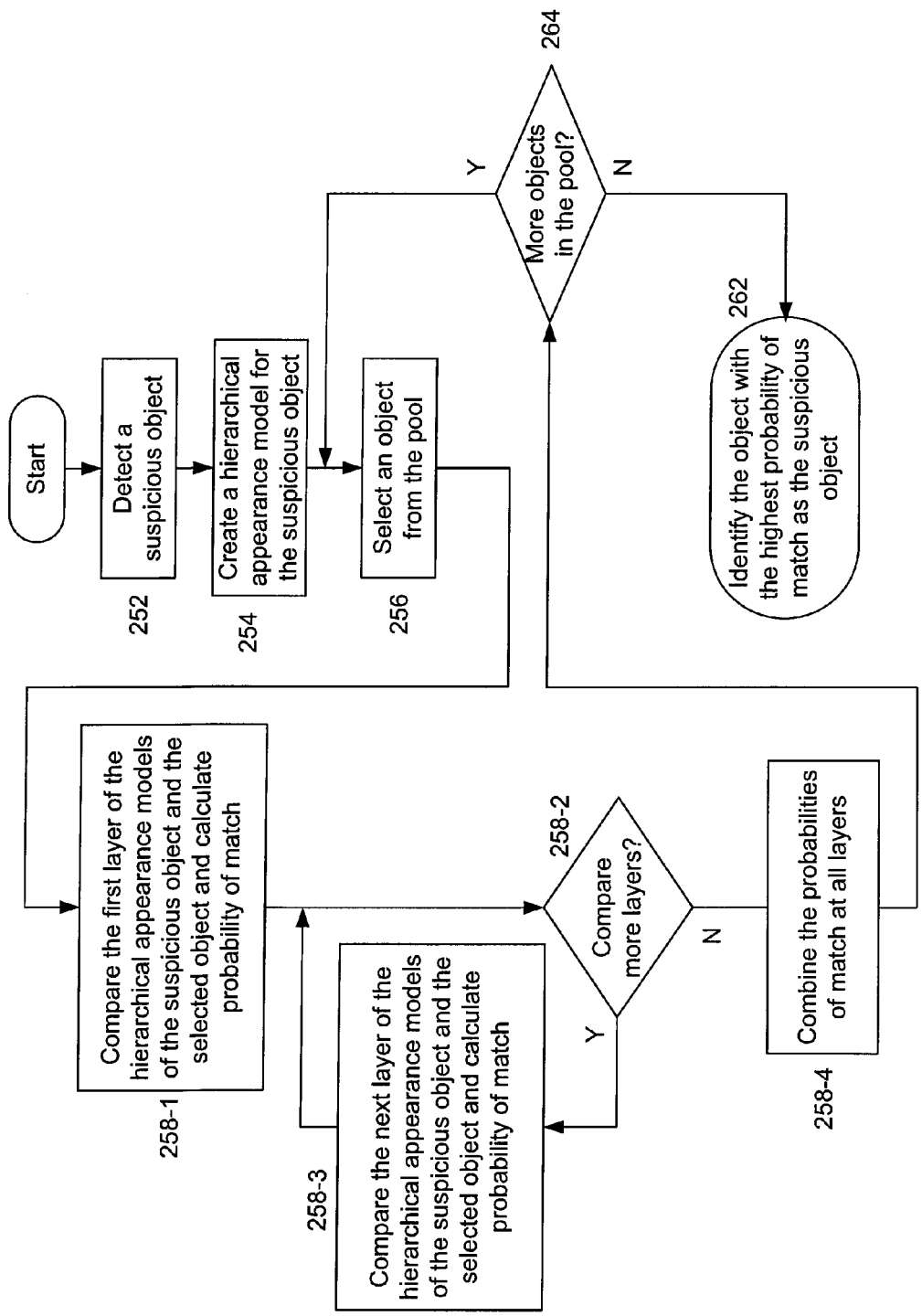

A further alternative approach to object re-identification consistent with embodiments of the present invention is shown in FIG. 2(e). A surveillance system consistent with embodiments of the present invention compares the suspicious object against all the objects in the pool based on the hierarchical appearance models thereof (256, 258-1 through 258-4, and 264), generates combined probabilities of match for all the objects in the pool by combining the probabilities of match calculated for several layers of the hierarchical appearance models (258-4), and identifies the object in the pool that has the highest probability of match as the suspicious object (262).

In one aspect, the probabilities of match calculated at multiple layers of the hierarchical appearance model are summed up to provide a final probability of match for a candidate object (258-4 of FIGS. 2(d) and 2(e)). In another aspect, the probabilities of match for the different layers are weighted first before being summed up (258-4 of FIGS. 2(*d*) and 2(*e*)). Weighting allows the system to control whether to focus on details. If details are important, more weight can be assigned to the probability of match calculated at a deep layer of the hierarchical appearance model.

A particular example is now described to illustrate an implementation of an embodiment of the present invention. In this particular example, the objects are human beings. The human beings move around in a building. One or more video cameras are installed in the building to monitor the activities of the human beings. A computer connected to the video cameras receives, stores, and processes images captured by the video cameras. In the event any suspicious activity occurs, the video cameras capture images of a suspicious person and send the images to the computer for re-identification.

Figure 3:
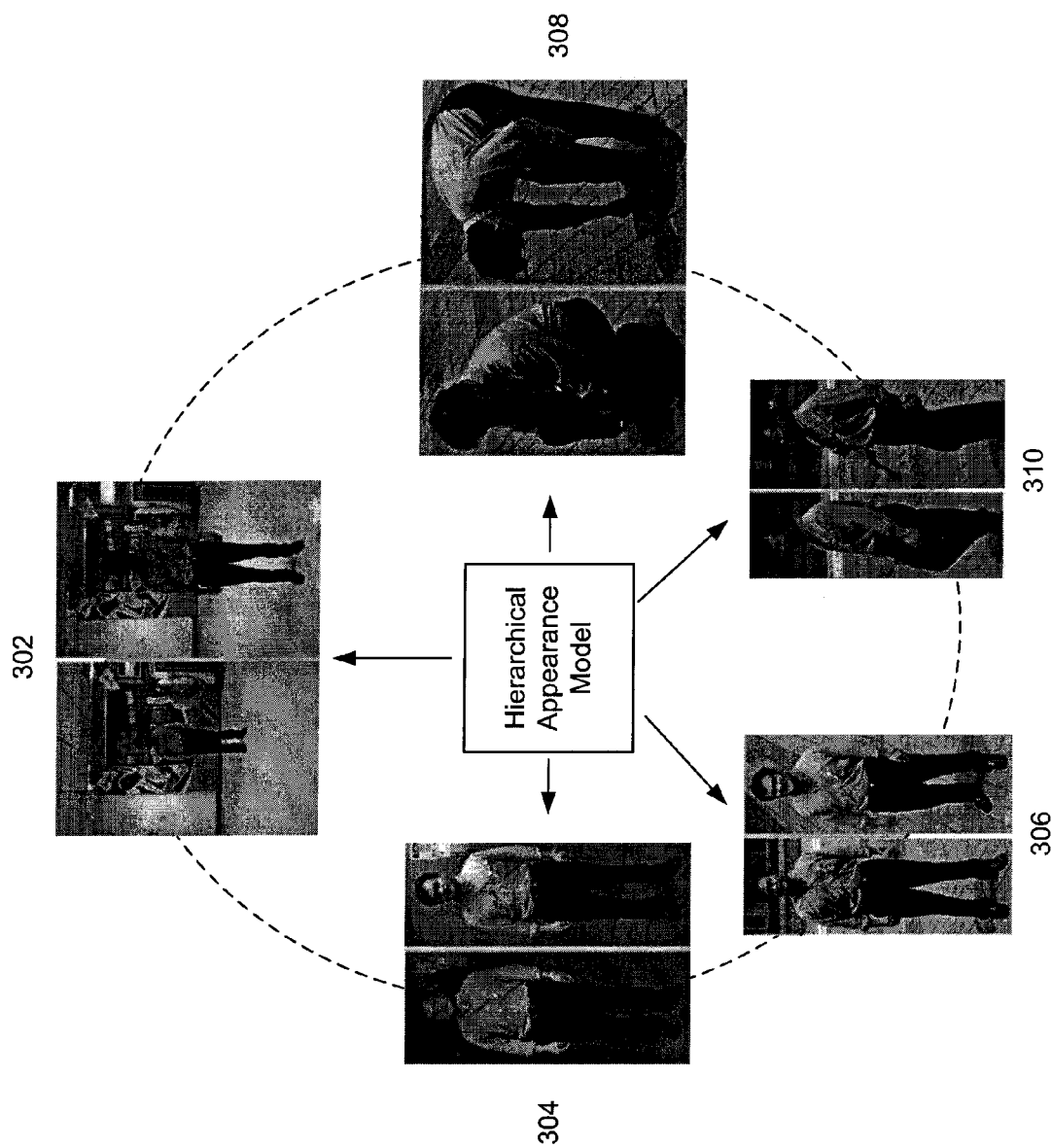
FIG. 3 illustrates impact of changes in environment and object posture on images of an object.

The video cameras may be in different parts of the building, and as a result may capture images with different lighting. The video cameras may also be shooting images of the same part of the building but at different view angles or from different distances. Further, a person may be changing his position and posture between images. FIG. 3 shows five pairs of images of the same person showing such possible variations. The pair at the top of FIG. 3, labeled "302," are two images of the same person shot from different distances. The pair on the left of FIG. 3, labeled "304," are two images shot with different lighting. The pair at the bottom left corner of FIG. 3, labeled "306," are two images shot at different viewing angles. The other two pairs, labeled "308" and "310," are shot when the person changes his posture.

The hierarchical appearance model consistent with embodiments of the present invention allows for object re-identification in changing environment. In particular, the hierarchical appearance model is based on parameters of an object, e.g., a person, that do not significantly change in such changing environment, as illustrated in FIG. 3. The relative color distribution of the appearance of the person, for example, does not significantly change with a change in the background lighting, the viewing angle of the camera, the distance of the cameras from the person, or the posture of the person. Thus, the detailed description below of the exemplary implementation of an embodiment of the present invention uses color distribution as a parameter for building a hierarchical appearance model. However, it is to be understood that other parameters may also be used to create the hierarchical appearance model consistent with embodiments of the present invention, depending on the need of the particular application.

Before generating the hierarchical appearance model, the computer first identifies and extracts the object of interest, i.e., a person in this particular example, by subtracting an image without the person from the image with the person. This process is called foreground extraction and is well known in the art. It is to be understood that the object of interest does not have to be the person in the entirety. The object of interest may be a part, such as the face, of the person. Hereinafter, it is assumed that the object of interest is the person in the entirety.

The computer then builds a hierarchical appearance model based on the color distribution of the person. As is well known in the art, the color of a pixel in an image can be digitally represented using several methods. For example, the RGB method assigns each of the red, green, and blue components of a color a compositional value. The HSV method represents a color in terms of hue, saturation, and value. In addition, each pixel in an image also has an intensity. If the image is black and white, then only intensity is needed to describe the color of a pixel. Regardless which method is used to represent the color, one or more parameters can be used to describe the object.

The computer first generates a set of histograms for each parameter that describes the color in an image. Thus, only one set of histograms will be generated for a black and white image. If the image is a color image, more than one set of histograms will be generated.

Figure 4:
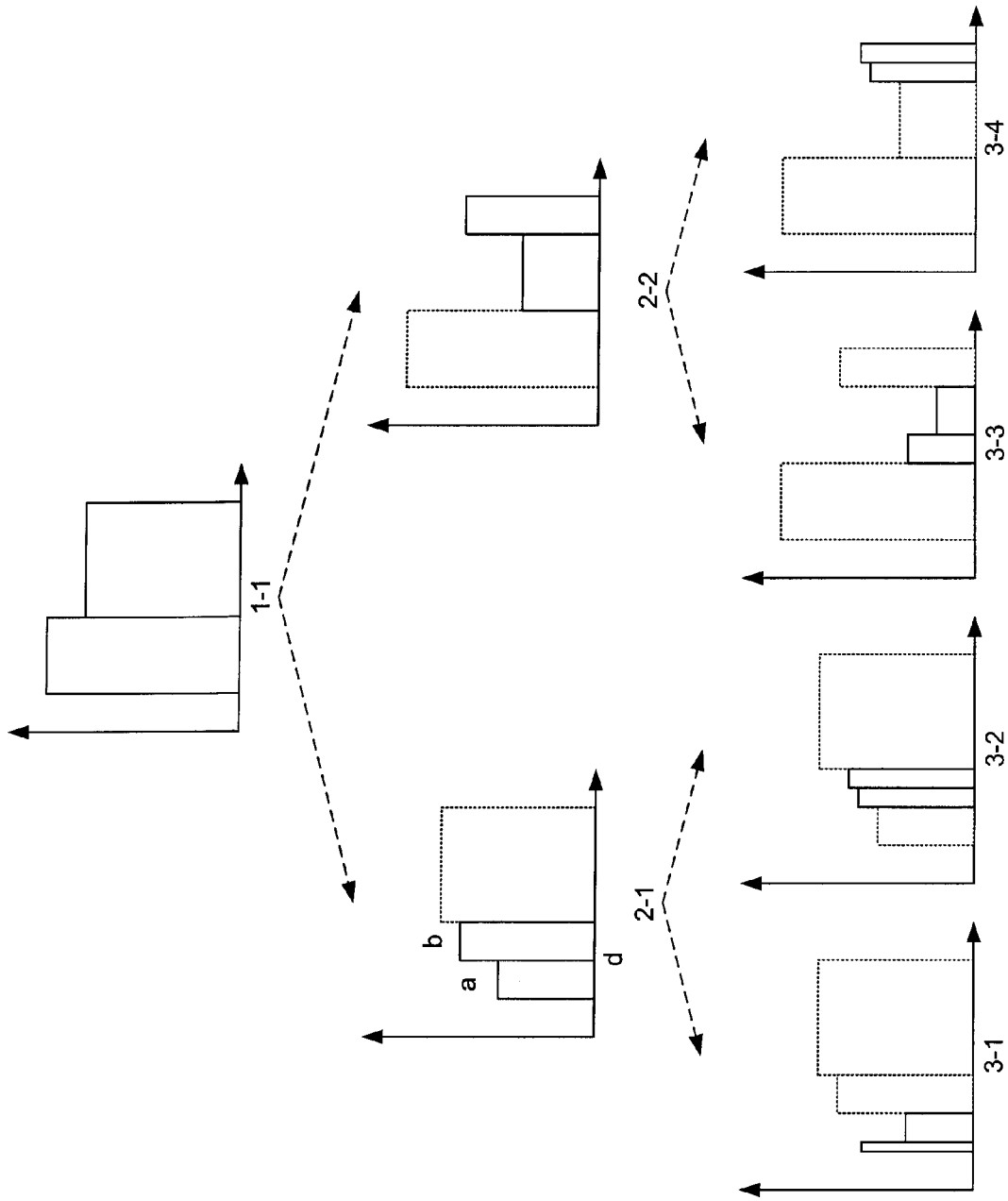
FIG. 4 illustrates histograms generated from an image of an object consistent with embodiments of the present invention.

Consistent with embodiments of the present invention, each set of histograms includes multiple histograms with different levels of details. In particular, bins with different widths may be defined to generate the histograms, as shown in FIG. 4. Consider the intensity of the pixels as an example. The entire range of intensity is divided into two subranges and a first histogram 1-1 including two bins corresponding to the two subranges may be generated. A second histogram 2-1 may be generated by further dividing one of the bins of histogram 1-1 into two bins. A third histogram 2-2 may be generated by further dividing another bin of histogram 1-1 into two bins. Similarly, additional histograms, such as histograms 3-1, 3-2, 3-3, 3-4 of FIG. 4, can be generated by further dividing the bins of histograms 2-1 and 2-2. As the bins get smaller, the level of details of the image contained in the histograms improves.

Consistent with embodiments of the present invention, a hierarchical appearance model can be built such that the histograms constitute the nodes in the hierarchical appearance model. Using the example shown in FIG. 4, a hierarchical appearance model consistent with embodiments of the present invention may have histogram 1-1 as the node at the top layer, histograms 2-1 and 2-2 as the nodes at the second layer, and histograms 3-1, 3-2, 3-3, and 3-4 as the nodes at the third layer, etc. Thus, the hierarchical appearance model has the same tree structure as the set of histograms of FIG. 4.

Even though FIG. 4 shows that each histogram propagates into two histograms in the next layer, it is to be understood that a finer division of the bins can result in more than two histograms from each histogram, in which case a node in the hierarchical appearance model will have more than two child nodes.

Figure 5:
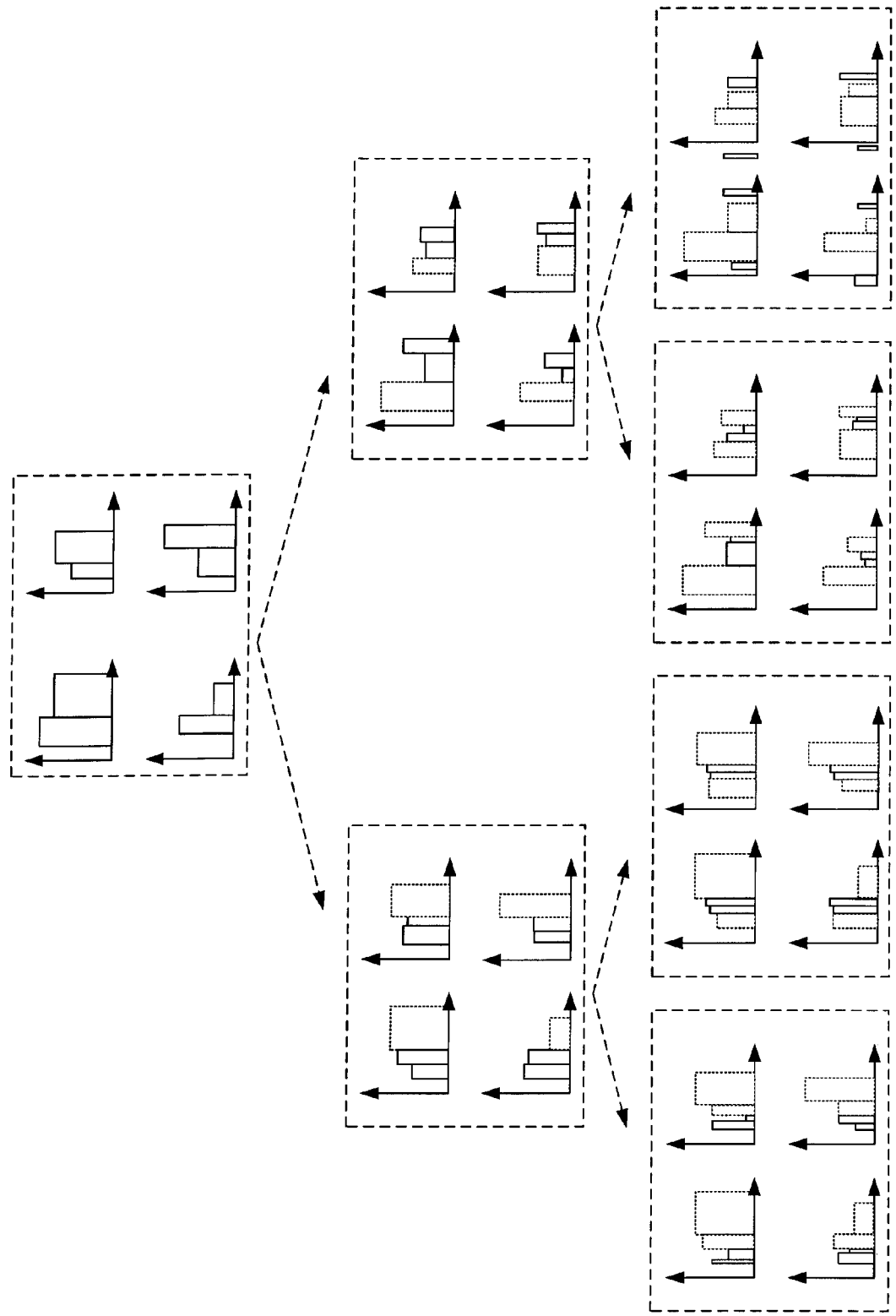
FIG. 5 illustrates histograms generated from an image of an object consistent with embodiments of the present invention.

Consistent with embodiments of the present invention, one set of histograms is generated for each parameter that describes the image, and a hierarchical appearance model can be built from each set of histograms. As a result, several hierarchical appearance models can be generated from one image described by multiple parameters. Alternatively, all the sets of histograms for the multiple parameters can be combined into one hierarchical appearance model. For example, if all sets of histograms have the same structure as the set shown in FIG. 4, they can be combined to create a hierarchical appearance model, wherein each node of the hierarchical appearance model contains multiple histograms, each for one of the parameters that describe the image. FIG. 5 shows an example of a hierarchical appearance model consistent with embodiments of the present invention in which each node contains four histograms corresponding to four different parameters.

Consistent with embodiments of the present invention, each node of a hierarchical appearance model of an object can store the complete information of the corresponding one or more histograms. Alternatively, each node of the hierarchical appearance model can store only information not already stored at its parent node. For example, referring to FIG. 4, the node of the hierarchical appearance model containing histogram 2-1 does not need to store the information of the bin represented by the dashed line, which is already stored at the parent node containing histogram 1-1, and only needs to store information of bins a and b. In addition, each node of the hierarchical appearance model only needs to store the numbers representing the points of division that creates the additional bins and the widths of the additional bins. Referring again to FIG. 4 as an example, the node of the hierarchical appearance model containing histogram 2-2 only needs to identify the point d that separates bins a and b and the heights of bins a and b.

In one aspect, the bins in each histogram have the same width. In another aspect, the bins in each histogram have different widths, as shown in FIGS. 4 and 5. Consistent with embodiments of the present invention, there is provided a method for adaptively partitioning a range to create bins of a histogram, as illustrated in FIG. 6.

Figure 6:
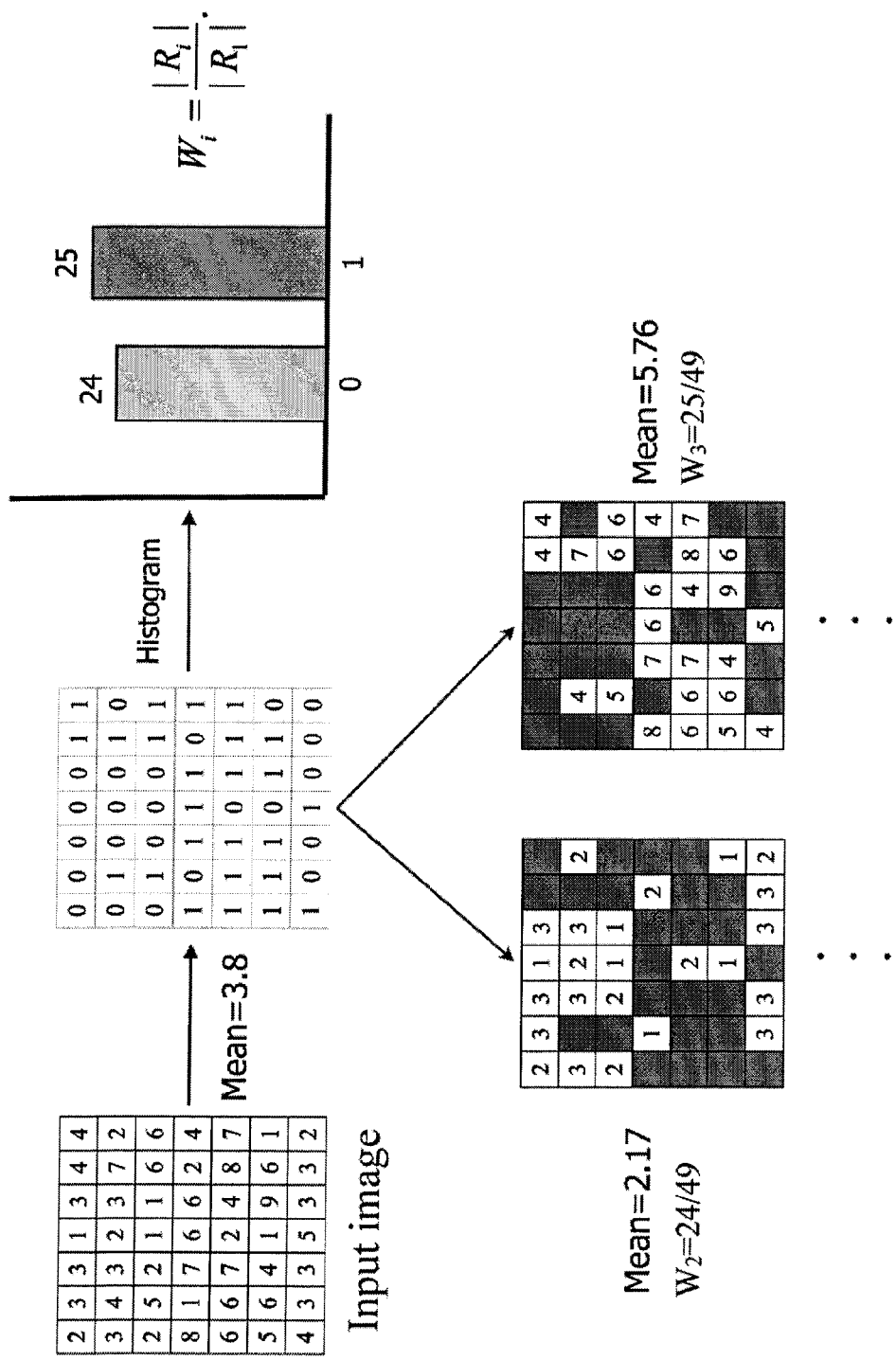
FIG. 6 illustrates a method for generating histograms consistent with embodiments of the present invention.

In FIG. 6, an image has 7×7=49 pixels, and one parameter, such as the intensity, of the 49 pixels, has values of 1~9. For the first histogram, the entire range of the parameter is divided into two subranges by the mean value of the intensity, which is 3.8. Thus, the first histogram has two bins, where one of the bins, labeled "0," represents the number of pixels having an intensity below 3.8, and the other, labeled "1," represents the number of pixels having an intensity above 3.8. As shown in FIG. 6, the two bins have sizes 24 and 25, respectively.

The process of using the mean value to divide a range into two subranges is repeated to create child histograms. In particular, out of the 24 pixels having an intensity below 3.8, the mean value is 2.17. Thus, the intensity range from 1-3.8 is further divided into two subranges: 1-2.17 and 2.17-3.8, and a corresponding histogram (not shown in FIG. 6) would show the 24 pixels in two bins corresponding to the two subranges. Similarly, the mean value of the pixels having an intensity above 3.8 is 5.76 and therefore the corresponding intensity range is further divided into two subranges: 3.8-5.76 and 5.76-9. A third histogram (not shown) can therefore be generated to show the 25 pixels having an intensity above 3.8 in two bins corresponding to the two subranges. Although FIG. 6 only shows one histogram, one skilled in the art should now understand how to construct the other histograms.

Figure 7:
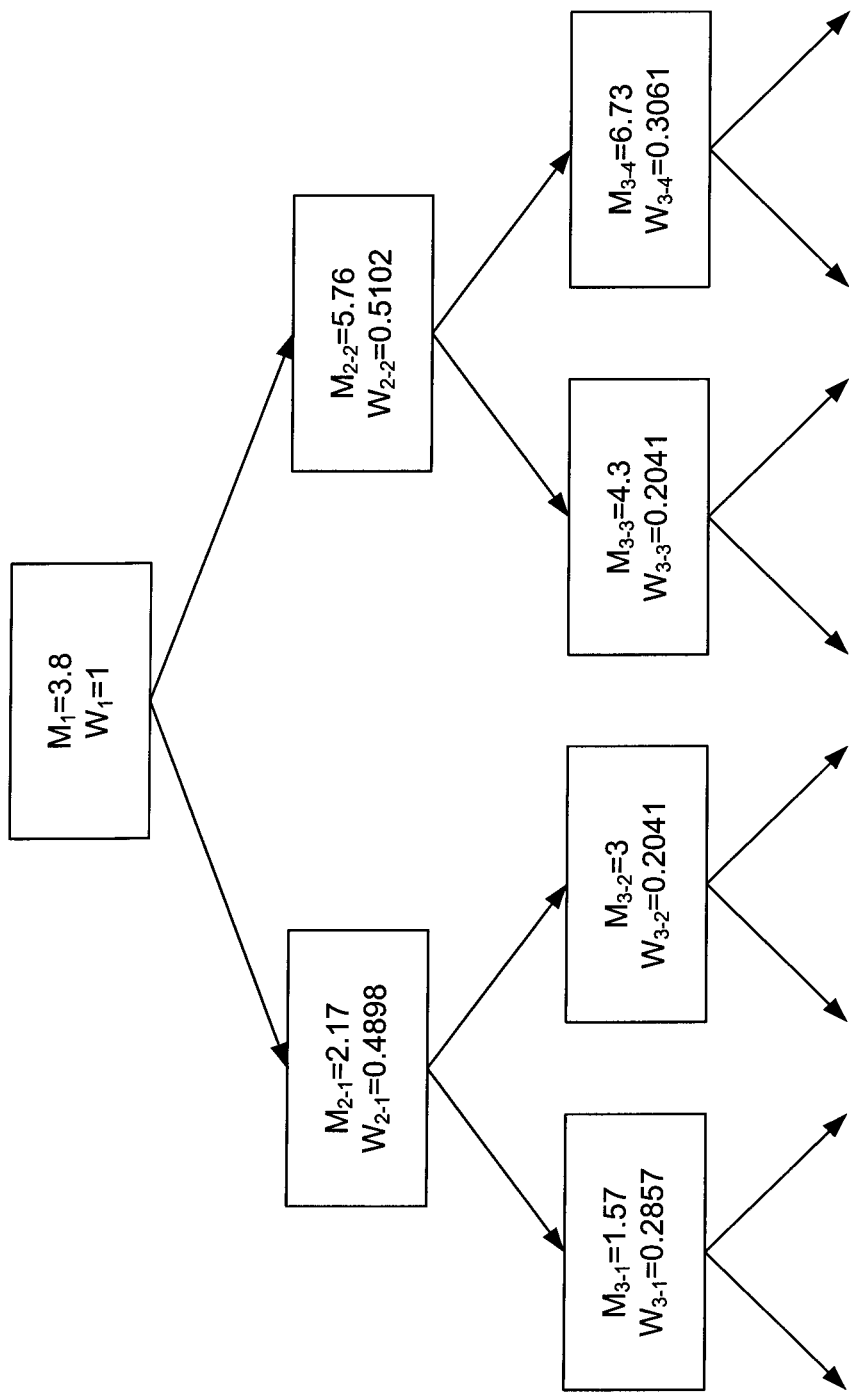
FIG. 7 shows an exemplary hierarchical appearance model consistent with embodiments of the present invention generated from the example shown in FIG. 6.

Consistent with embodiments of the present invention, a hierarchical appearance model of intensity of the image is generated based on the histograms generated using the method described above with reference to FIG. 6. FIG. 7 shows a hierarchical appearance model based on the example of FIG. 6. Each node of the hierarchical appearance model stores the mean value of the pixels shown in the corresponding histogram. The node at the top layer stores a mean value of $M_1$=3.8. One of the two nodes at the second layer stores a mean value of $M_{2-1}$=2.17. The other node at the second layer stores a mean value of $M_{2-2}$=5.76.

In one aspect, each node of the hierarchical appearance model also stores a pixel ratio, i.e., the ratio of the number pixels shown in the corresponding histogram to the total number of pixels in the image. For example, the first histogram in FIG. 6 shows all 49 pixels, and the corresponding node in the hierarchical appearance model stores a pixel ratio of $W_1$=1. The second histogram should show 24 pixels having intensity below 3.8, and therefore the corresponding node in the hierarchical appearance model stores a pixel ratio of $W_{2-1}$=24/49=0.4898. Similarly, the node in the hierarchical appearance model of FIG. 7 corresponding to the third histogram stores a pixel ratio of $W_{2-2}$=0.5102.

Similarly, if multiple parameters are used to describe the image, each node of a hierarchical appearance model consistent with embodiments of the present invention contains the mean value of each parameter and the corresponding pixel ratio for each parameter.

Consistent with embodiments of the present invention, the mean value and pixel ratio for each node in the hierarchical appearance model are calculated as follows. First, mean value $M_1$ is the mean value of a parameter for all pixels in the image, and $W_1$=1. $R_1$ is the set of all pixels in the image. Next, for a node i in the hierarchical appearance model, where i>1, define set $R_i$ as follows:

$$R_i = \begin{cases} \{x \mid x \in R_{\lfloor i/2 \rfloor}, x \geq M_{\lfloor i/2 \rfloor}\}, & \text{if } i \text{ is odd} \\ \{x \mid x \in R_{\lfloor i/2 \rfloor}, x < M_{\lfloor i/2 \rfloor}\}, & \text{if } i \text{ is even,} \end{cases}$$

where $\lfloor a \rfloor$ is the greatest integer smaller than a, $\{x \mid x \in R_{\lfloor i/2 \rfloor}, x \geq M_{\lfloor i/2 \rfloor}\}$ denotes the set of pixels belonging to $R_{\lfloor i/2 \rfloor}$ but with a value of the parameter equal to or greater than $M_{\lfloor i/2 \rfloor}$, and $\{x \mid x \in R_{\lfloor i/2 \rfloor}, x < M_{\lfloor i/2 \rfloor}\}$ denotes the set of pixels belonging to $R_{\lfloor i/2 \rfloor}$ but with a value of the parameter less than $M_{\lfloor i/2 \rfloor}$. Then, the mean value $M_i$ and pixel ratio $W_i$ are calculated as follows:

$$M_i = \left(\sum_{j=1}^{|R_i|} x_j\right) / |R_i|, x \in R_i, \text{ and}$$

$$W_i = \frac{|R_i|}{|R_1|},$$

where $|R_i|$ is the number of pixels belonging to the set $R_i$. Then the hierarchical appearance model can be constructed to have nodes 1, 2, . . . , with node i propagating into two child nodes 2i and 2i+1.

The hierarchical appearance model based on color distribution consistent with embodiments of the present invention is resistant to changes in background lighting, distance between the object and the camera, the viewing angel, and the posture of the object.

For example, FIGS. 8(a)-8(e) show five images of the same person with different background lighting. More particularly, the background lighting intensity increases by 20% from FIG. 8(a) to FIG. 8(b), increases by 80% from FIG. 8(a) to FIG. 8(c), decreases by 20% from FIG. 8(a) to FIG. 8(d), and decreases by 40% from FIG. 8(a) to FIG. 8(e). Consistent with embodiments of the present invention, five hierarchical appearance models are generated from the five images shown in FIGS. 8(a)-8(e). FIGS. 8(f) and 8(g) respectively illustrate the mean values and pixel ratios for the light intensity of the pixels stored at the two nodes at the second layer of the hierarchical appearance models generated for the five images shown in FIGS. 8(a)-8(e) consistent with embodiments of the present invention. FIGS. 8(h) and 8(i) respectively illustrate the mean values and pixel ratios for the light intensity of the pixels stored at the four nodes at the third layer of the hierarchical appearance models generated for the five images shown in FIGS. 8(a)-8(e) consistent with embodiments of the present invention. Labels "a", "b," "c," "d," and "e" in FIGS. 8(f)-8(i) respectively refer to the values calculated based on the images of FIGS. 8(a)-8(e). Labels "1" and "2" in FIGS. 8(f) and 8(g) respectively refer to the two nodes at the second layer of the hierarchical appearance models. Labels "1," "2," "3," and "4" in FIGS. 8(h) and 8(i) respectively refer to the four nodes at the third layer of the hierarchical appearance models.

Figure 8I:
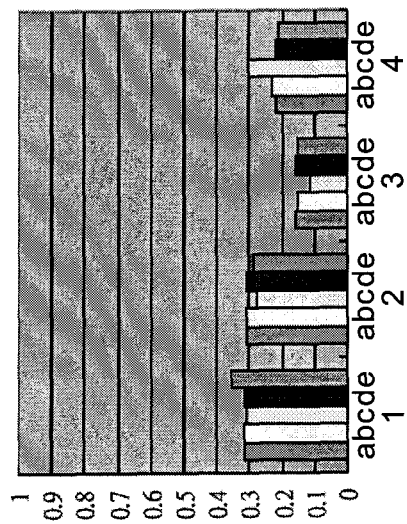
Figure 8H:
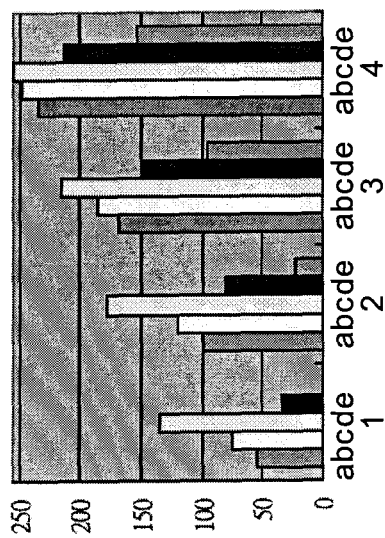

As shown in FIGS. 8(f) and 8(h), because the background lighting changes between the images shown in FIGS. 8(a)-8(e), the mean value of the intensity varies too. However, as shown in FIGS. 8(g) and 8(i), the pixel ratios, which reflect the relative numbers of pixels falling below and above the mean value, are relatively constant regardless of the change in the background lighting. Thus, the hierarchical appearance models based on the light intensity is illumination invariant and can produce a reliable re-identification result even though background lighting changes.

Figure 9I:
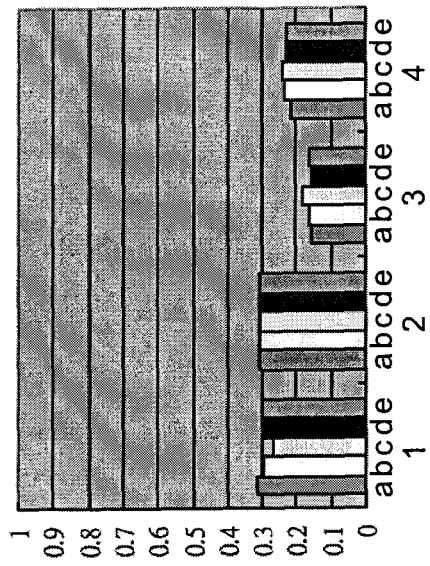
Figure 9H:
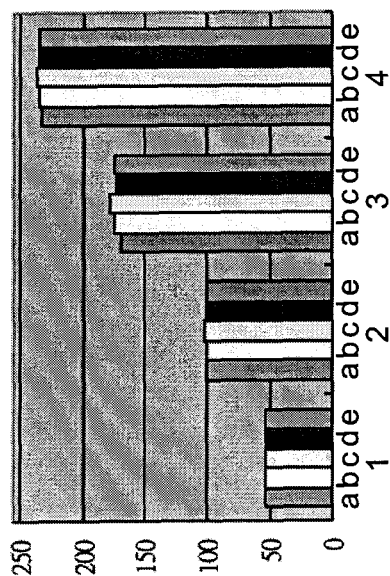

FIGS. 9(a)-9(i) illustrate performance of hierarchical appearance models consistent with embodiments of the present invention with scaling changes due, for example, to changes in a distance between a camera and an object. More specifically, FIGS. 9(a)-9(e) show five images of the same person taken from different distances. The size of the person in the image decreases by 20% from FIG. 9(a) to FIG. 9(b), decreases by 80% from FIG. 9(a) to FIG. 9(c), increases by 20% from FIG. 9(a) to FIG. 9(d), and increases by 80% from FIG. 9(a) to FIG. 9(e). Consistent with embodiments of the present invention, five hierarchical appearance models are generated from the five images shown in FIGS. 9(a)-9(e). FIGS. 9(f) and 9(g) respectively illustrate the mean values and pixel ratios for the light intensity of the pixels stored at the two nodes at the second layer of the hierarchical appearance models generated for the five images shown in FIGS. 9(a)-9(e). FIGS. 9(h) and 9(i) respectively illustrate the mean values and pixel ratios for the light intensity of the pixels stored at the four nodes at the third layer of the hierarchical appearance models. Labels "a", "b," "c," "d," and "e" in FIGS. 9(f)-9(i) respectively refer to the values calculated based on the images of FIGS. 9(a)-9(e). Labels "1" and "2" in FIGS. 9(f) and 9(g) respectively refer to the two nodes at the second layer of the hierarchical appearance models. Labels "1," "2," "3," and "4" in FIGS. 9(h) and 9(i) respectively refer to the four nodes at the third layer of the hierarchical appearance models.

As FIGS. 9(f)-9(i) show, even though the size of the person in each image is different from that in the other images, the mean values of intensity and the pixel ratios stay relatively constant. Thus, the hierarchical appearance model based on the light intensity of the pixels is scale invariant and can produce reliable re-identification result even though the scale of the object in the image changes.

Figure 10C:
FIGS. 10(a)-10(g) illustrate performance of hierarchical appearance models consistent with embodiments of the present invention when view angles of a camera or the orientation of an observed object change.
Figure 10B:
Figure 10A:
Figure 10E:
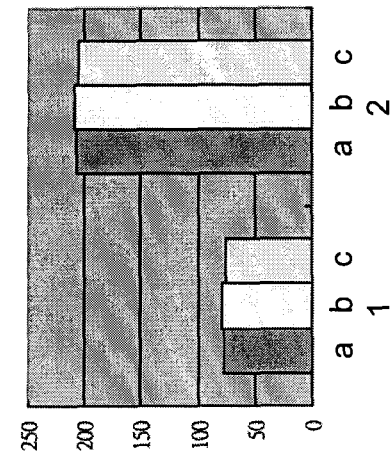
Figure 10D:
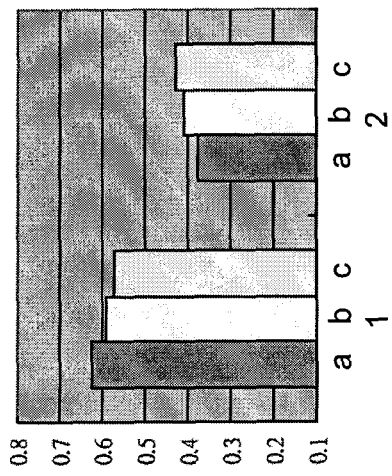
Figure 10G:
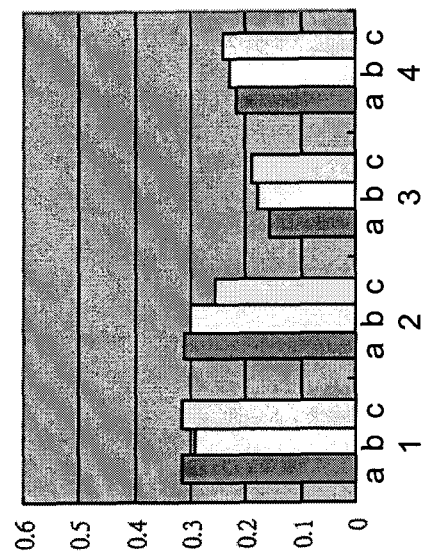
Figure 10F:
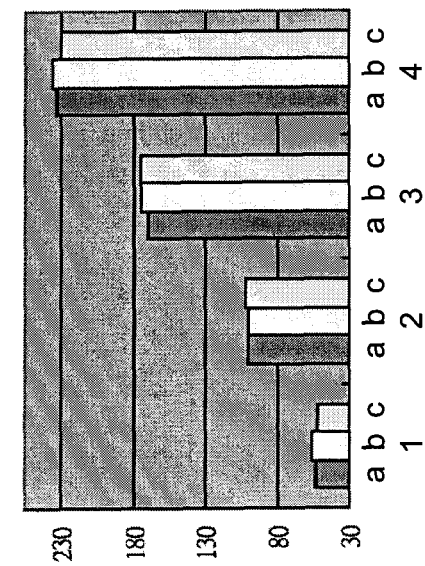

The hierarchical appearance model consistent with embodiments of the present invention is also resistant to viewing angle changes or changes in the orientation of the observed object, as illustrated in FIGS. 10(a)-10(g). Particularly, FIGS. 10(a)-10(c) show three images of the same person taken from different angles. Consistent with embodiments of the present invention, three hierarchical appearance models are generated from the three images shown in FIGS. 10(a)-10(c). FIGS. 10(d) and 10(e) respectively illustrate the mean values and pixel ratios for the light intensity of the pixels stored at the two nodes at the second layer of the hierarchical appearance models generated for the three images shown in FIGS. 10(a)-10(c). FIGS. 10(f) and 10(g) respectively illustrate the mean values and pixel ratios for the light intensity of the pixels stored at the four nodes at the third layer of the hierarchical appearance models generated for the three images shown in FIGS. 10(a)-10(c). Labels "a", "b," and "c" in FIGS. 10(d)-10(g) respectively refer to the values calculated based on the images of FIGS. 10(a)-10(c). Labels "1" and "2" in FIGS. 10(d) and 10(e) respectively refer to the two nodes at the second layer of the hierarchical appearance models. Labels "1," "2," "3," and "4" in FIGS. 10(f) and 10(g) respectively refer to the four nodes at the third layer of the hierarchical appearance models.

As FIGS. 10(d)-10(g) show, even though the viewing angle has changed, the mean values of intensity and the pixel ratios stay relatively constant. Thus, the hierarchical appearance model consistent with embodiments of the present invention is resistant to changes in viewing angle.

Figure 11F:
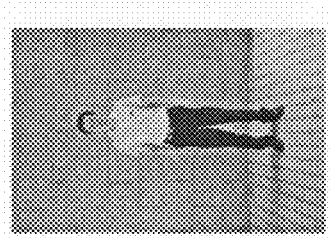
FIGS. 11(a)-11(j) illustrate performance of hierarchical appearance models consistent with embodiments of the present invention when the posture of an object changes.
Figure 11E:
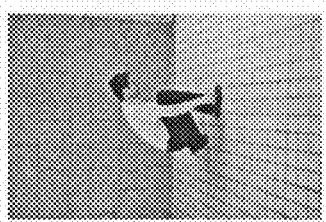
Figure 11D:
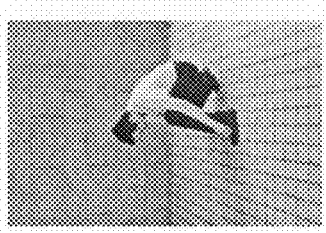
Figure 11C:
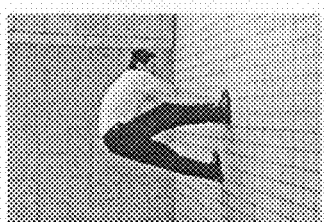
Figure 11B:
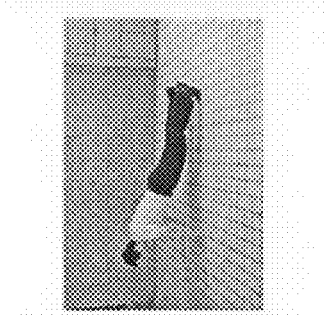
Figure 11A:
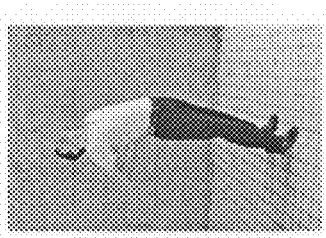
Figure 11G:
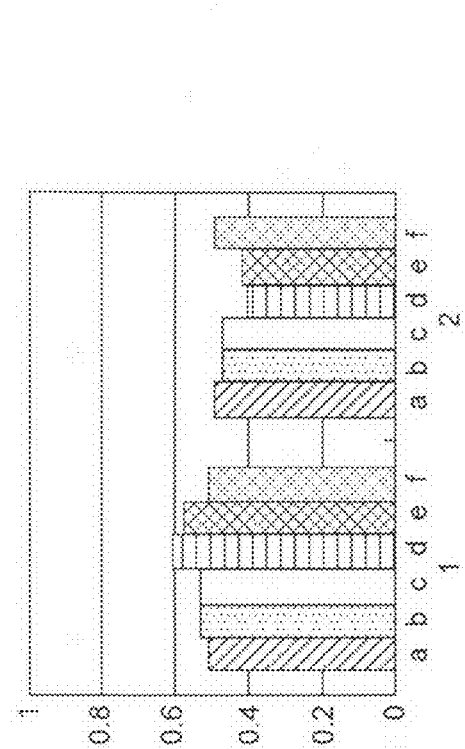
Figure 11H:
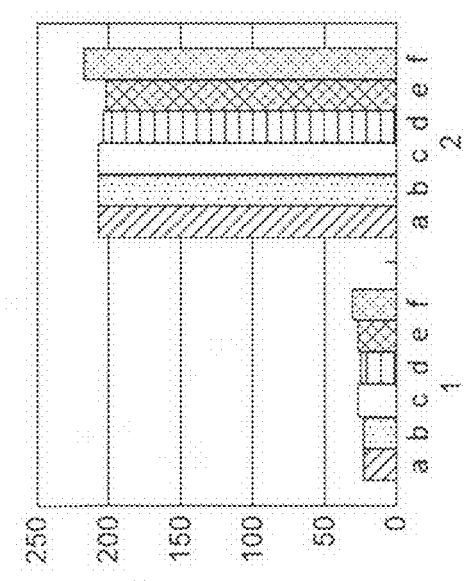
Figure 11I:
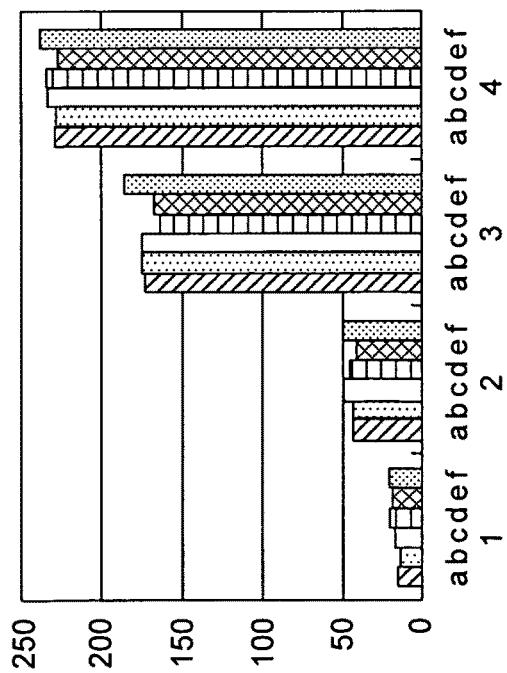
Figure 11J:
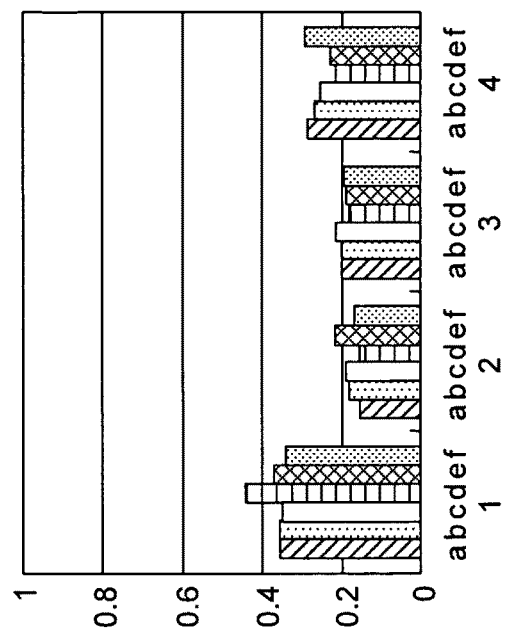

FIGS. 11(a)-11(j) illustrate the impact of changes in object posture on the performance of the hierarchical appearance model consistent with embodiments of the present invention. More particularly, FIGS. 11(a)-11(f) show six images of the same person with different postures. Consistent with embodiments of the present invention, six hierarchical appearance models are generated from the six images shown in FIGS. 11(a)-11(f). FIGS. 11(g) and 11(h) respectively illustrate the mean values and pixel ratios for the light intensity of the pixels stored at the two nodes at the second layer of the hierarchical appearance models generated for the six images shown in FIGS. 11(a)-11(f). FIGS. 11(i) and 11(j) respectively illustrate the mean values and pixel ratios for the light intensity of the pixels stored at the four nodes at the third layer of the hierarchical appearance models generated for the six images shown in FIGS. 11(a)-11(f). Labels "a", "b," "c," "d," "e," and "f" in FIGS. 11(g)-11(j) respectively refer to the values calculated based on the images of FIGS. 8(a)-8(e). Labels "1" and "2" in FIGS. 11(g) and 11(h) respectively refer to the two nodes at the second layer of the hierarchical appearance models. Labels "1," "2," "3," and "4" in FIGS. 11(i) and 11(j) respectively refer to the four nodes at the third layer of the hierarchical appearance models.

As FIGS. 11(g)-11(j) show, even though the posture of the object has changed, the mean values of intensity and the pixel ratios stay relatively constant. Thus, the hierarchical appearance model consistent with embodiments of the present invention is resistant to changes in object posture.

Figure 12H:
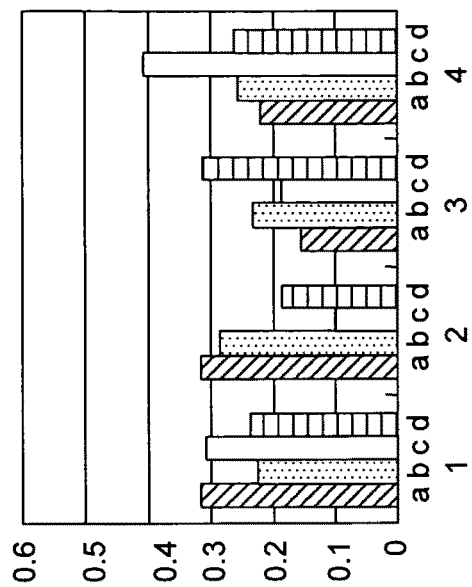
Figure 12G:
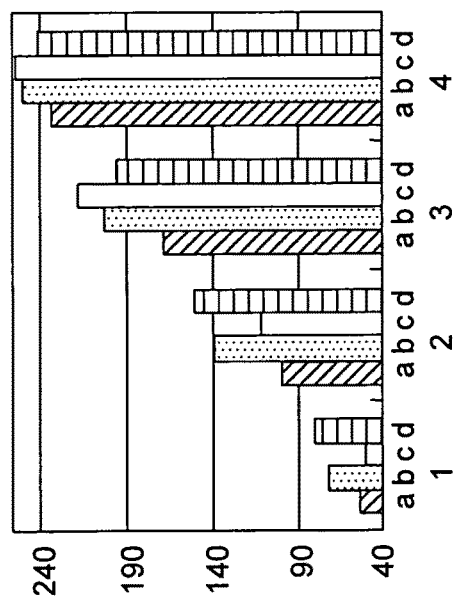

FIGS. 12(a)-12(h) illustrate the performance of the hierarchical appearance model consistent with embodiments of the present invention in distinguishing images of different objects. In particular, FIGS. 12(a)-12(d) show images of four different persons. Consistent with embodiments of the present invention, four hierarchical appearance models are generated from the four images shown in FIGS. 12(a)-12(d). FIGS. 12(e) and 12(f) respectively illustrate the mean values and pixel ratios for the light intensity of the pixels stored at the two nodes at the second layer of the hierarchical appearance models generated for the four images shown in FIGS. 12(a)-12(d). FIGS. 12(g) and 12(h) respectively illustrate the mean values and pixel ratios for the light intensity of the pixels stored at the four nodes at the third layer of the hierarchical appearance models generated for the four images shown in FIGS. 12(a)-12(d). Labels "a", "b," "c," and "d" in FIGS. 12(e)-12(h) respectively refer to the values calculated based on the images of FIGS. 12(a)-12(d). Labels "1" and "2" in FIGS. 12(e) and 12(f) respectively refer to the two nodes at the second layer of the hierarchical appearance models. Labels "1," "2," "3," and "4" in FIGS. 12(g) and 12(h) respectively refer to the four nodes at the third layer of the hierarchical appearance models.

As FIGS. 12(e)-12(h) show, images of different objects result in substantially different mean values and pixel ratios at several layers of the hierarchical appearance models. Accordingly, the hierarchical appearance model consistent with embodiments of the present invention can effectively distinguish different objects.

Figure 13:
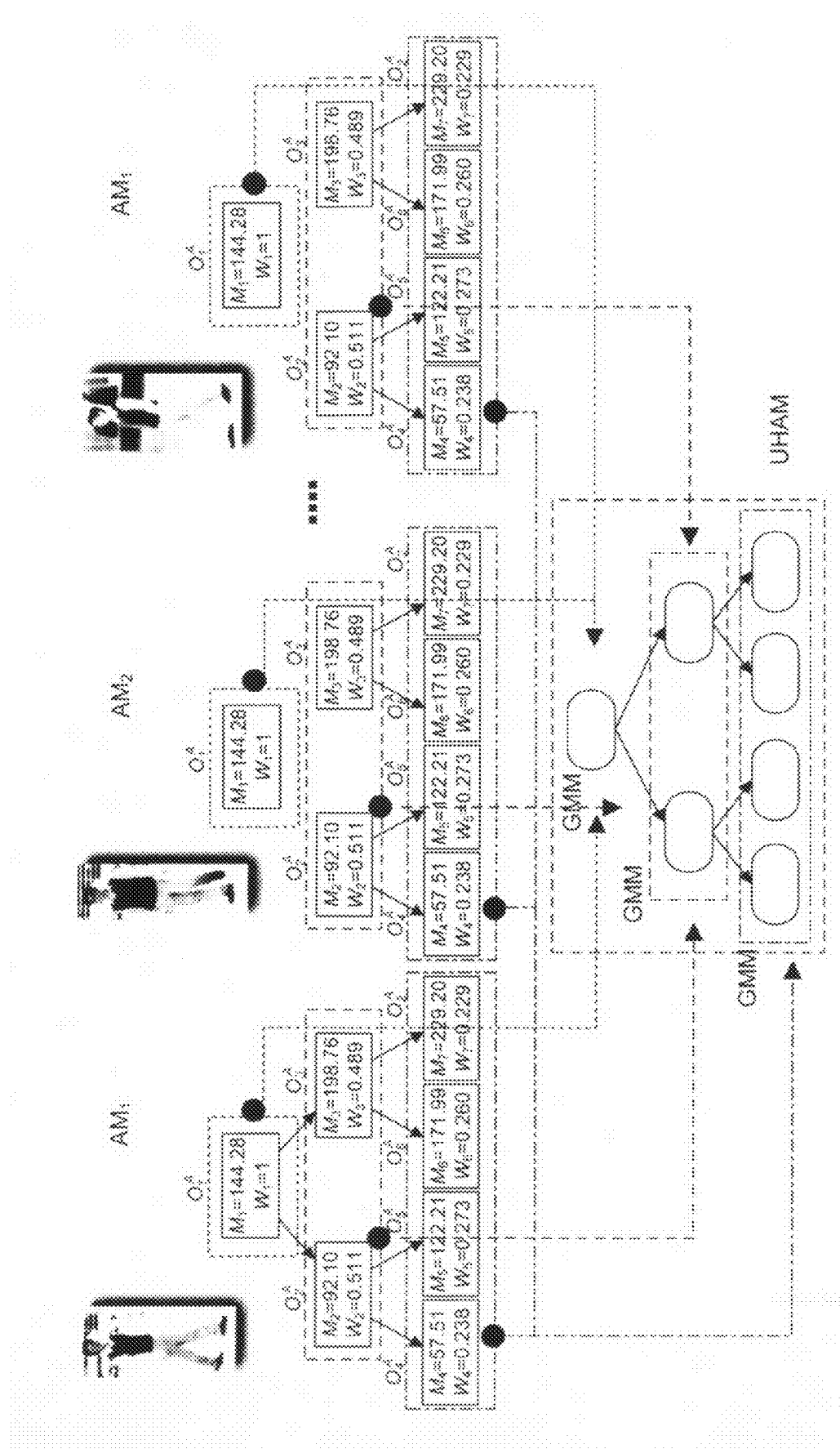
FIG. 13 shows a uniform hierarchical appearance model consistent with embodiments of the present invention.

Consistent with embodiments of the present invention, there is also provided a method for combining multiple images of an object to create a uniform hierarchical appearance model that better estimates the attributes of the object, as illustrated in FIG. 13. When multiple images of an object are available, several hierarchical appearance models, $AM_1$, $AM_2, \ldots, AM_N$, each based on one of the images can be created. These hierarchical appearance models can then be combined on a node-by-node or layer-by-layer basis to create a new, uniform hierarchical appearance model (UHAM). Each node or each layer in the UHAM contains a statistical model of the parameters that describe the images.

For example, when the mean values and pixel ratios are calculated based on intensity, each node in the hierarchical appearance model contains two numbers, the corresponding mean value and the corresponding pixel ratio, as shown in FIG. 13. The mean values and pixel ratios of the nodes in corresponding layers of the multiple hierarchical appearance models are statistically combined to create a statistical model, such as a Gaussian mixture model (GMM). The GMM is a multi-dimensional model and can represent multiple components or parameters of an object. Therefore, instead of several hierarchical appearance models each representing the distribution of a parameter, a single UHAM using GMMs consistent with embodiments of the present invention can describe multiple aspects of an object. Each layer of the UHAM contains a GMM that describes the nodes in that layer. Depending on the application, each node in a layer of the UHAM may contain one or more components of the GMM. In a re-identification process, the nodes in a layer of the hierarchical appearance model of a suspicious object are analyzed to determine whether they fit in the GMM of the corresponding layer of the UHAM of a candidate object.

The different approaches of re-identification shown in FIGS. 2(b)-2(e) also apply to a system using UHAMs consistent with embodiments of the present invention. In particular, when a statistical model such as the Gaussian mixture model is used, the probability of match for one parameter at each layer (258-3 in FIGS. 2(d) and 2(e)) can be calculated directly from the Gaussian mixture model.

It is to be understood that the present invention is not limited to using a GMM at a layer of a UHAM. Any statistical model can be used to combine multiple images to describe the attributes of an object.

When multiple parameters, such as HSV and intensity, are used to describe the images, a re-identification method consistent with embodiments of the present invention calculates the probability of match using each parameter for each candidate object in the pool, as illustrated in FIG. 2(e). In one aspect, if the same object has the highest probabilities of match for all the parameters, then that object is identified as the match of the suspicious object. If, however, different objects in the pool have the highest probabilities of match for different parameters, it may be determined that no match of the suspicious object exists in the pool. Consistent with another aspect of embodiments of the present invention, the final probabilities of match for the several parameters are further combined to yield a combined final probability for each candidate object. The candidate object in the pool having the highest combined final probability is identified as the match of the suspicious object.

Even though examples of determining the probability of match between the suspicious object and candidate objects are given above, one skilled in the art should now understand that the present invention is not limited to any particular method. Various statistical tools existing today can be adopted in a system using hierarchical appearance models consistent with embodiments of the present invention for re-identifying a suspicious object.

Figure 14:
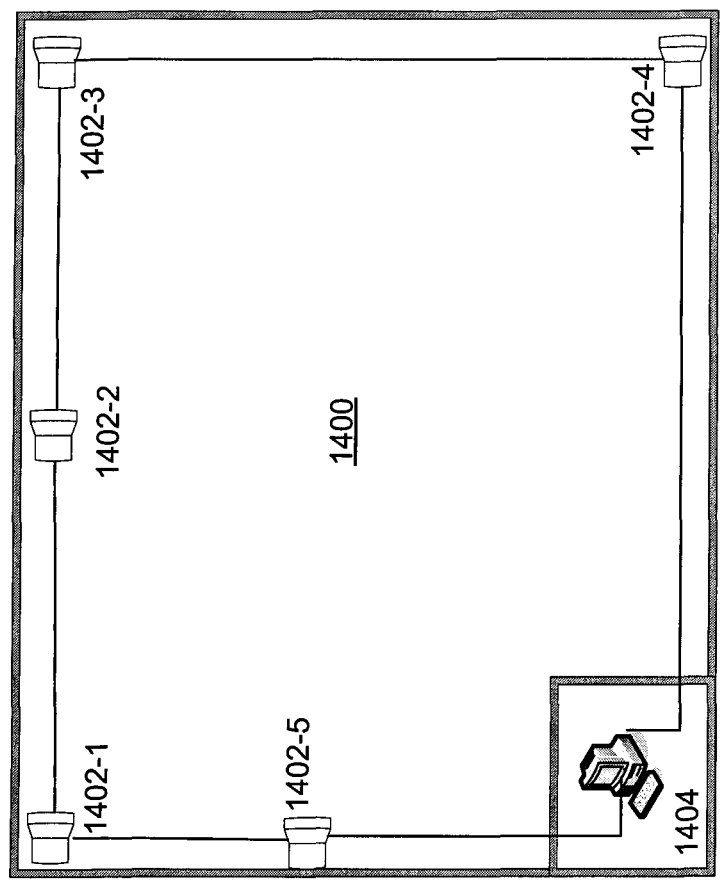
FIG. 14 shows a surveillance system consistent with embodiments of the present invention.

To provide multiple images of the same object for creating a UHAM, a system consistent with embodiments of the present invention may adopt a camera that can capture multiple images in a row, or multiple cameras to take multiple images of the same object simultaneously, or multiple cameras installed at different places of a building to capture multiple images when an object moves around, or a combination of these approaches. As an example, FIG. 14 shows a surveillance system 1400 consistent with embodiments of the present invention installed a building (not numbered). Surveillance system 1400 includes multiple cameras 1402-1, 1402-2, 1402-3, 1402-4, and 1402-5, each capable of capturing one or more images of objects. Surveillance system 1400 also includes a computer 1404 connected to cameras 1402-1, 1402-2, 1402-3, 1402-4, and 1402-5 for receiving and processing the images and for creating and comparing hierarchical appearance models consistent with embodiments of the present invention.

It will be apparent to those skilled in the art that various modifications and variations can be made in the disclosed embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for creating an appearance model of an object, comprising:

receiving an image of an object;

identifying a parameter for describing the object;

creating a hierarchical appearance model of the object from the image of the object, the hierarchical appearance model having a plurality of layers, each layer including one or more nodes, wherein the nodes in each layer contain information of the object with a corresponding level of detail, and wherein the nodes in different layers of the hierarchical appearance model correspond to different levels of detail; and for each node of the hierarchical appearance model, generating a histogram of the image of the object using the parameter, wherein the histogram includes a plurality of bins, and bin width corresponds to the level of detail of the node.

2. The method of claim 1, wherein creating the hierarchical appearance model includes, for each node in the hierarchical appearance model, extracting information with a corresponding level of detail of the node from the image of the object; and storing the extracted information at the node.

3. The method of claim 2, further comprising:

receiving additional images of the object; and wherein creating the hierarchical appearance model further includes, for each node in the hierarchical appearance model, extracting information of the object with the corresponding level of detail of the node from the additional images; and storing the information extracted from the additional images at the node.

4. The method of claim 1, wherein each node contains information of multiple aspects of the object.

5. The method of claim 4, wherein the multiple aspects include color and intensity.

6. The method of claim 1, wherein generating the histogram includes determining a mean value of the parameter and defining the bins of the histogram based on the mean value.

7. The method of claim 1, further comprising:
receiving additional images of the object.

8. The method of claim 7, wherein creating the hierarchical appearance model further includes storing, at each node of the hierarchical appearance model, the histograms generated for the node.

9. The method of claim 7, wherein creating the hierarchical appearance model further includes, for each node of the hierarchical appearance model:
combining the histograms generated for the node; and
storing results of the combination at the node.

10. The method of claim 9, wherein combining the histograms for each node in a layer of the hierarchical appearance model includes creating a Gaussian mixture model from the histograms generated for the nodes in the layer, and wherein storing the results of the combination includes storing the Gaussian mixture model at the layer of the hierarchical appearance model.

11. The method of claim 1, wherein each node of the hierarchical appearance model contains information of multiple aspects of the object.

12. The method of claim 1, further comprising:
receiving images of additional objects; and
creating a plurality of additional hierarchical appearance models each of one of the additional objects.

13. A surveillance system, comprising:
at least one camera for generating at least one image of an object; and
a computer for creating a hierarchical appearance model of the object from the at least one image of the object, the hierarchical appearance model having a plurality of layers, each layer including one or more nodes, wherein the one or more nodes in each layer contain information of the object with a corresponding level of detail, and wherein the nodes in different layers of the hierarchical appearance model correspond to different levels of detail,
wherein the computer identifies a parameter for describing the object and, for each node of the hierarchical appearance model, the computer generates a histogram of the at least one image of the object using the parameter, wherein the histogram includes a plurality of bins, and bin width corresponds to the level of detail of the node.

14. The system of claim 13, wherein, for each node in the hierarchical appearance model, the computer extracts information with a corresponding level of detail from the at least one image of the object and stores the extracted information at the node.

15. The system of claim 13, wherein each node contains information of multiple aspects of the object.

16. The system of claim 15, wherein the multiple aspects include color and intensity.

17. The system of claim 13, wherein the at least one camera includes a plurality of cameras.

18. The system of claim 13, wherein the at least one camera generates a plurality of images of the object, wherein, for each node in the hierarchical appearance model, the computer extracts information of the object with the corresponding level of detail of the node from the plurality of images and stores the information extracted from the plurality of images at the node.

19. The system of claim 13, wherein the computer determines a mean value of the parameter and defines the bins of the histogram based on the mean value.

20. The system of claim 13, wherein the at least one camera generates a plurality of images of the object.

21. The system of claim 20, wherein the computer stores at each node of the hierarchical appearance model the histograms generated for the node.

22. The system of claim 20, wherein, for each node of the hierarchical appearance model, the computer combines the histograms generated for the node and stores results of the combination at the node.

23. The system of claim 20, wherein the computer combines the histograms generated for each node in a layer of the hierarchical appearance model by creating a Gaussian mixture model from the histograms generated for the nodes in the layer, and stores the Gaussian mixture model at the layer.

24. The system of claim 13, wherein the computer stores at each node of the hierarchical appearance model information of multiple aspects of the object.

25. A method for identifying a suspicious object from a pool of objects, wherein each object in the pool has a uniform hierarchical appearance model, the method comprising:
receiving an image of a suspicious object;
identifying a parameter for describing the suspicious object;
creating a hierarchical appearance model of the suspicious object from the image of the suspicious object, the hierarchical appearance model of the suspicious object having a plurality of layers, each layer including one or more nodes, wherein the nodes in each layer contain information of the suspicious object with a corresponding level of detail, and wherein the nodes in different layers of the hierarchical appearance model of the suspicious object correspond to different levels of detail;
for each node of the hierarchical appearance model, generating a histogram of the image of the suspicious object using the parameter, wherein the histogram includes a plurality of bins, and bin width corresponds to the level of detail of the node; and
comparing the hierarchical appearance model of the suspicious object with the uniform hierarchical appearance models of the objects in the pool.

26. The method of claim 25, wherein the uniform hierarchical appearance model of each of the objects in the pool includes a plurality of layers, each layer including one or more nodes, wherein the one or more nodes in each layer contain information of the object with a corresponding level of detail, wherein the nodes in different layers correspond to different levels of detail, and wherein each layer of the hierarchical appearance model of the suspicious object corresponds to one of the layers of the uniform hierarchical appearance model of each of the objects in the pool.

27. The method of claim 26, wherein comparing the hierarchical appearance model of the suspicious object with the uniform hierarchical appearance models of the objects in the pool includes comparing corresponding layers of the hierarchical appearance model of the suspicious object and the uniform hierarchical appearance models of the objects in the pool.

28. The method of claim 27, wherein each layer of the uniform hierarchical appearance model of each of the objects in the pool contains a statistical model describing the object at the corresponding level of detail, and wherein comparing the corresponding layers of the hierarchical appearance model of the suspicious object and the uniform hierarchical appearance model of the objects in the pool includes determining if a layer of the hierarchical appearance model of the suspicious object is consistent with the statistical models of the corresponding layers of the uniform hierarchical appearance models of the objects in the pool.

29. The method of claim 28, wherein the statistical model is a Gaussian mixture model.

30. The method of claim 28, wherein determining if a layer of the hierarchical appearance model of the suspicious object is consistent with the statistical models of the corresponding layers of the uniform hierarchical appearance models of the objects in the pool includes, for one of the objects in the pool, calculating a probability of match based on the information in a layer of the hierarchical appearance model of the suspicious object and the statistical model of the corresponding layer of the uniform hierarchical appearance model of the one of the objects of the pool.

31. The method of claim 30, wherein the comparing includes:
 repeating the calculating of the probability of match for several corresponding layers, and
 combining the probabilities of match for the several corresponding layers.

32. The method of claim 31, wherein combining the probabilities of match includes summing the probabilities of match for the several corresponding layers.

33. The method of claim 31, wherein combining the probabilities of match includes calculating a weighted sum of the probabilities of match for the several corresponding layers.

34. The method of claim 26, wherein comparing the hierarchical appearance model of the suspicious object with the uniform hierarchical appearance models of the objects in the pool includes,
 comparing a first layer of the hierarchical appearance model of the suspicious object with a corresponding first layer of the uniform hierarchical appearance model of a first one of the objects in the pool; and
 if the first layer of the hierarchical appearance model of the suspicious object matches the corresponding first layer of the uniform hierarchical appearance model of the first one of the objects in the pool, comparing a second layer of the hierarchical appearance model of the suspicious object with a corresponding second layer of the uniform hierarchical appearance model of the first one of the objects in the pool, wherein the second layer of the hierarchical appearance model of the suspicious object and the corresponding second layer of the uniform hierarchical appearance model of the first one of the objects in the pool correspond to a higher level of detail of information of the respective objects than the first layer of the hierarchical appearance model of the suspicious object and the corresponding first layer of the uniform hierarchical appearance model of the first one of the objects in the pool.

35. The method of claim 26, further comprising determining if the suspicious object matches one of the objects in the pool by determining whether several layers of the hierarchical appearance model of the suspicious object match the corresponding layers of the uniform hierarchical appearance model of the one of the objects in the pool.

36. The method of claim 26, wherein comparing the hierarchical appearance model of the suspicious object with the uniform hierarchical appearance models of the objects in the pool includes comparing corresponding layers of the hierarchical appearance model of the suspicious object and the uniform hierarchical appearance models of the objects in the pool, the method further comprising:
 determining if the suspicious object matches one of the objects in the pool by statistically combining results of comparing the corresponding layers in the uniform hierarchical appearance models of the suspicious object and the one of the objects in the pool.

37. The method of claim 25, wherein the hierarchical appearance model of the suspicious object and the uniform hierarchical appearance models of the objects in the pool each contain information of a plurality of aspects of the respective objects, and wherein comparing the hierarchical appearance model of the suspicious object with the uniform hierarchical appearance models of the objects in the pool includes comparing the suspicious object and one of the objects in the pool in each of the plurality of aspects using the hierarchical appearance model of the suspicious object and the uniform hierarchical appearance model of the one of the objects in the pool.

38. The method of claim 37, further comprising indicating that the suspicious object matches the one of the objects in the pool if the suspicious object matches the one of the objects in the pool in all of the plurality of aspects.

39. The method of claim 37, further comprising combining results of comparing the suspicious object and the one of the objects in the pool in all of the plurality of aspects to determine if the suspicious object matches the one of the objects in the pool.

40. The method of claim 25, wherein creating the hierarchical appearance model of the suspicious object includes, for each node in the hierarchical appearance model of the suspicious object,
 extracting information with a corresponding level of detail from the image of the suspicious object; and
 storing the extracted information at the node.

41. The method of claim 25, wherein generating the histogram includes determining a mean value of the parameter and defining the bins of the histogram based on the mean value.

42. The method of claim 25, wherein each node of the hierarchical appearance model of the suspicious object contains information of multiple aspects of the suspicious object.

43. A surveillance system, comprising:
 at least one camera for generating at least one image of each of a plurality of objects in a pool and for generating an image of a suspicious object; and
 a computer for creating a uniform hierarchical appearance model of each of the objects in the pool from the at least one image of the object, for creating a hierarchical appearance model of the suspicious object from the image of the suspicious object, and for comparing the hierarchical appearance model of the suspicious object with the uniform hierarchical appearance models of the objects in the pool,
 wherein each of the uniform hierarchical appearance models of the objects in the pool and the hierarchical appearance model of the suspicious object has a plurality of layers, each layer including one or more nodes, wherein the nodes in each layer contain information of the respective object with a corresponding level of detail, and wherein the nodes in different layers correspond to different levels of detail,
 wherein the computer identifies a parameter for describing the objects, wherein, for each node of the uniform hierarchical appearance model of one of the objects in the pool, the computer generates a histogram of the at least one image thereof using the parameter, wherein the histogram includes a plurality of bins, and bin width corresponds to the level of detail of the node.

44. The system of claim 43, wherein, for each node in the uniform hierarchical appearance model of one of the objects in the pool, the computer extracts information with a corresponding level of detail from the at least one image of the one of the objects and stores the extracted information at the node.

45. The system of claim 43, wherein each node in the uniform hierarchical appearance model of one of the objects in the pool contains information of multiple aspects of the one of the objects.

46. The system of claim 43, wherein the at least one camera includes a plurality of cameras.

47. The system of claim 43, wherein the at least one camera generates a plurality of images of one of the objects in the pool, wherein, for each node in the uniform hierarchical appearance model of the one of the objects, the computer extracts information of the one of the objects with the level of detail of the node from the plurality of images thereof and stores the extracted information at the node.

48. The system of claim 43, wherein the computer determines a mean value of the parameter and defines the bins of the histogram based on the mean value.

49. The system of claim 43, wherein the at least one camera generates a plurality of images of one of the objects in the pool.

50. The system of claim 49, wherein the computer stores at each node of the uniform hierarchical appearance model of the one of the objects the histograms generated for the node.

51. The system of claim 49, wherein, for each node of the uniform hierarchical appearance model of the one of the objects, the computer combines the histograms generated for the node and stores the results of the combination at the node.

52. The system of claim 49, wherein the computer combines the histograms generated for each node in a layer of the uniform hierarchical appearance model of the one of objects by creating a Gaussian mixture model from the histograms generated for the nodes in the layer, and stores the Gaussian mixture model at the layer.

53. The system of claim 43, wherein the computer stores at each node of the uniform hierarchical appearance model of each of the objects information of multiple aspects of the corresponding object.

54. The system of claim 53, wherein the computer compares the suspicious object and the one of the objects in the pool in each of the plurality of aspects using the hierarchical appearance model of the suspicious object and the uniform hierarchical appearance model of the one of the objects in the pool.

55. The method of claim 54, wherein the computer indicates that the suspicious object matches the one of the objects in the pool if the suspicious object matches the one of the objects in the pool in all of the plurality of aspects.

56. The method of claim 54, wherein the computer combines the results of comparing the suspicious object and the one of the objects in the pool in all of the plurality of aspects to determine if the suspicious object matches the one of the objects in the pool.

57. The system of claim 43, wherein the computer compares corresponding layers in the hierarchical appearance model of the suspicious object and the uniform hierarchical appearance models of the objects in the pool.

58. The system of claim 57, wherein each layer in the uniform hierarchical appearance model of each of the objects in the pool contains a statistical model describing the object at the corresponding level of detail, and wherein the computer compares the corresponding layers in the hierarchical appearance model of the suspicious object and the uniform hierarchical appearance model of one of the objects in the pool by determining if a layer of the hierarchical appearance model of the suspicious object is consistent with the statistical model of the corresponding layer of the uniform hierarchical appearance model of the one of the objects.

59. The system of claim 58, wherein the statistical model is a Gaussian mixture model.

60. The system of claim 58, wherein the computer determines if a layer of the hierarchical appearance model of the suspicious object is consistent with the statistical model of the corresponding layer of the uniform hierarchical appearance model of the one of the objects by calculating a probability of match based on the information in the layer of the hierarchical appearance model of the suspicious object and the statistical model of the corresponding layer of the uniform hierarchical appearance model of the one of the objects.

61. The system of claim 60, wherein the computer repeats the calculating of the probability of match for several corresponding layers of the hierarchical appearance model of the suspicious object and the uniform hierarchical appearance model of the one of the objects and combines the probabilities of match for the several corresponding layers.

62. The system of claim 61, wherein the computer combines the probabilities of match by summing the probabilities of match for the several corresponding layers.

63. The system of claim 61, wherein the computer combines the probabilities of match by calculating a weighted sum of the probabilities of match for the several corresponding layers.

64. The system of claim 43, wherein the computer compares the hierarchical appearance model of the suspicious object with the uniform hierarchical appearance model of one of the objects by
comparing a first layer of the hierarchical appearance model of the suspicious object with a corresponding first layer of the uniform hierarchical appearance model of the one of the objects; and
if the first layer of the hierarchical appearance model of the suspicious object matches the corresponding first layer of the uniform hierarchical appearance model of the one of the objects match, comparing a second layer of the hierarchical appearance model of the suspicious object with a corresponding second layer of the uniform hierarchical appearance model of the one of the objects, wherein the second layer of the hierarchical appearance model of the suspicious object and the corresponding second layer of the uniform hierarchical appearance model of the one of the objects correspond to a higher level of detail of information of the respective objects than the first layer of the hierarchical appearance model of the suspicious object and the corresponding first layer of the uniform hierarchical appearance model of the one of the objects.

65. The system of claim 43, wherein the computer determines if the suspicious object matches one of the objects in the pool by determining whether several layers of the hierarchical appearance model of the suspicious object match the corresponding layers of the uniform hierarchical appearance model of the one of the objects in the pool.

66. The system of claim 65, wherein the computer determines if the suspicious object matches one of the objects in the pool by statistically combining the results of comparing the corresponding layers of the hierarchical appearance model of the suspicious object and the uniform hierarchical appearance model of the one of the objects in the pool.

* * * * *